US009081733B2

(12) United States Patent
Reznik et al.

(10) Patent No.: US 9,081,733 B2
(45) Date of Patent: *Jul. 14, 2015

(54) 16-POINT TRANSFORM FOR MEDIA DATA CODING

(75) Inventors: Yuriy Reznik, Seattle, WA (US); Rajan L. Joshi, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/820,346

(22) Filed: Jun. 22, 2010

(65) Prior Publication Data

US 2011/0153699 A1 Jun. 23, 2011

Related U.S. Application Data

(60) Provisional application No. 61/219,885, filed on Jun. 24, 2009.

(51) Int. Cl.
*H04N 7/12* (2006.01)
*H04N 11/02* (2006.01)
*G06F 17/14* (2006.01)

(52) U.S. Cl.
CPC .................................. *G06F 17/147* (2013.01)

(58) Field of Classification Search
None
See application file for complete search history.

(56) References Cited

U.S. PATENT DOCUMENTS

| | | | |
|---|---|---|---|
| 4,754,491 A | 6/1988 | Mischler et al. | |
| 5,278,646 A | 1/1994 | Civanlar et al. | |
| 5,408,425 A * | 4/1995 | Hou | 708/402 |
| 5,508,949 A | 4/1996 | Konstantinides | |
| 5,649,077 A | 7/1997 | On et al. | |

(Continued)

FOREIGN PATENT DOCUMENTS

| | | |
|---|---|---|
| CN | 1428719 A | 7/2003 |
| CN | 1436004 A | 8/2003 |

(Continued)

OTHER PUBLICATIONS

Huang et al., "An Array-based Scalable Architecture for DCT Computations in Video Coding," IEEE International Conference Neural Networks & Signal Processing, Zhenjiang, China, Jun. 8-10, 2000, pp. 451-455.

(Continued)

*Primary Examiner* — Sath V Perungavoor
*Assistant Examiner* — Kate Luo
(74) *Attorney, Agent, or Firm* — Brent A. Boyd

(57) ABSTRACT

In general, techniques are described for implementing a 16-point inverse discrete cosine transform (IDCT) that is capable of applying multiple IDCTs of different sizes. For example, an apparatus comprising a 16-point inverse discrete cosine transform of type II (IDCT-II) unit may implement the techniques of this disclosure. The 16-point IDCT-II unit performs these IDCTs-II of different sizes to transform data from a spatial to a frequency domain. The 16-point IDCT-II unit includes an 8-point IDCT-II unit that performs one of the IDCTs-II of size 8 and a first 4-point IDCT-II unit that performs one of the IDCTs-II of size 4. The 8-point IDCT-II unit includes the first 4-point DCT-II unit. The 16-point IDCT-II unit also comprises an inverse 8-point DCT-IV unit that includes a second 4-point IDCT-II unit and a third 4-point IDCT-II unit. Each of the second and third 4-point IDCT-II units performs one of the IDCTs-II of size 4.

53 Claims, 8 Drawing Sheets

(56) References Cited

U.S. PATENT DOCUMENTS

| | | | |
|---|---|---|---|
| 5,737,450 A | 4/1998 | Hajjahmad et al. | |
| 5,768,167 A | 6/1998 | Kuroda | |
| 5,959,675 A | 9/1999 | Mita et al. | |
| 6,029,185 A | 2/2000 | Tonomura | |
| 6,252,994 B1 | 6/2001 | Nafarieh | |
| 7,366,236 B1* | 4/2008 | Winger | 375/240.02 |
| 7,412,100 B2 | 8/2008 | Raveendran et al. | |
| 7,437,394 B2 | 10/2008 | Hou | |
| 7,725,516 B2 | 5/2010 | Liu | |
| 2001/0054051 A1 | 12/2001 | Tajime | |
| 2002/0106020 A1 | 8/2002 | Cheng et al. | |
| 2003/0076904 A1 | 4/2003 | Magee | |
| 2003/0078952 A1 | 4/2003 | Kim et al. | |
| 2003/0078953 A1 | 4/2003 | Hallapuro et al. | |
| 2003/0093452 A1 | 5/2003 | Zhou | |
| 2003/0133507 A1 | 7/2003 | Miro et al. | |
| 2003/0152281 A1 | 8/2003 | Tomita et al. | |
| 2003/0177158 A1 | 9/2003 | Zheltov et al. | |
| 2004/0136602 A1 | 7/2004 | Nagaraj et al. | |
| 2005/0069035 A1 | 3/2005 | Lu et al. | |
| 2005/0141609 A1 | 6/2005 | Malvar et al. | |
| 2005/0213835 A1 | 9/2005 | Guangxi et al. | |
| 2005/0281331 A1* | 12/2005 | Hahm et al. | 375/240.03 |
| 2006/0126962 A1 | 6/2006 | Sun | |
| 2006/0165164 A1 | 7/2006 | Kwan et al. | |
| 2007/0025441 A1 | 2/2007 | Ugur et al. | |
| 2007/0156398 A1* | 7/2007 | Hung et al. | 704/229 |
| 2007/0168410 A1 | 7/2007 | Reznik | |
| 2007/0200738 A1 | 8/2007 | Reznik et al. | |
| 2007/0233764 A1 | 10/2007 | Reznik et al. | |
| 2007/0297503 A1 | 12/2007 | Reznik | |
| 2008/0037656 A1 | 2/2008 | Hannuksela | |
| 2008/0049834 A1 | 2/2008 | Holcomb et al. | |
| 2009/0080515 A1 | 3/2009 | Nagaraj et al. | |
| 2009/0086816 A1 | 4/2009 | Leontaris et al. | |
| 2009/0141808 A1 | 6/2009 | Wong | |
| 2009/0157785 A1 | 6/2009 | Reznik et al. | |
| 2009/0180700 A1 | 7/2009 | Kim et al. | |
| 2010/0172409 A1 | 7/2010 | Reznik et al. | |
| 2010/0266008 A1 | 10/2010 | Reznik | |
| 2010/0309974 A1 | 12/2010 | Reznik | |
| 2010/0312811 A1 | 12/2010 | Reznik | |
| 2010/0329329 A1 | 12/2010 | Reznik et al. | |
| 2011/0026846 A1 | 2/2011 | Hsu et al. | |
| 2011/0150078 A1 | 6/2011 | Reznik et al. | |
| 2011/0150079 A1 | 6/2011 | Reznik et al. | |
| 2012/0177108 A1 | 7/2012 | Joshi et al. | |
| 2013/0121406 A1 | 5/2013 | Reznik et al. | |
| 2013/0148718 A1 | 6/2013 | Reznik et al. | |

FOREIGN PATENT DOCUMENTS

| | | |
|---|---|---|
| CN | 1455599 A | 11/2003 |
| CN | 1149499 C | 5/2004 |
| CN | 1617594 A | 5/2005 |
| CN | 1791222 A | 6/2006 |
| CN | 101047849 A | 10/2007 |
| CN | 101330616 A | 12/2008 |
| EP | 0917070 A2 | 5/1999 |
| EP | 1359546 A1 | 11/2003 |
| JP | H09212484 A | 8/1997 |
| JP | 2003223433 A | 8/2003 |
| JP | 2003281115 A | 10/2003 |
| JP | 2007129731 A | 5/2007 |
| KR | 1020010043396 | 5/2001 |
| KR | 100545445 B1 | 1/2006 |
| KR | 20060112255 A | 10/2006 |
| TW | 284869 A | 9/1996 |
| TW | I241074 B | 10/2005 |
| TW | 200714076 A | 4/2007 |
| TW | 200727578 | 7/2007 |
| TW | 200741486 A | 11/2007 |
| TW | 200801980 | 1/2008 |
| TW | I295455 B | 4/2008 |
| TW | I310526 B | 6/2009 |
| WO | 9910818 A1 | 3/1999 |
| WO | 0159603 A1 | 8/2001 |
| WO | 03019949 A2 | 3/2003 |
| WO | WO-03019787 A2 | 3/2003 |
| WO | 2007047478 | 4/2007 |
| WO | 2009039451 A2 | 3/2009 |
| WO | 2009042943 A2 | 4/2009 |
| WO | 2011005583 A2 | 1/2011 |

OTHER PUBLICATIONS

Rao et al., "Discrete Cosine Transform: Algorithms, Advantages, Applications", Academic Press, San Diego, 1990.

Britanak et al., "Discrete Cosine and Sine Transforms: General Properties, Fast Algorithms and Integer Approximations", Academic Press, 2006.

Cham, "Development of integer cosine transforms by the principle of dyadic symmetry," Communications, Speech and Vision, IEE Proceedings I , vol. 136, No. 4, pp. 276-282, Aug. 1989.

Reznik et al., "Improved Precision of Fixed-Point Algorithms by Means of Common Factors," Proc. ICIP 2008, San Diego, CA.

Reznik et al., "On Design of Transforms for High-Resolution / High-Performance Video Coding, MPEG input document M16438," MPEG's 88th meeting, Maui, HI, Apr. 2009.

Reznik et al., "Efficient Fixed-Point Approximations of 8x8 Inverse Discrete Cosine Transform," Applications of Digital Image Processing XXX, vol. 6696, Oct. 8, 2007, 17 pp.

Loeffler, "Algorithm-architecture mapping for custom DCT chips." in Proc. Int. Symp. Circuits Syst. (Helsinki, Finland), Jun. 1988, pp. 1953-1956.

Liang, "Fast Multiplierless Approximations of the DCT With the Lifting Scheme," IEEE Transactions on Signal Processing, vol. 49, No. 12, Dec. 2001, pp. 3032-3044.

Sullivan, "Standardization of IDCT approximation behavior for video compression: the history and the new MPEG-C parts 1 and 2 standards," Applications of Digital Image Processing XXX vol. 6696, 2007, 22 pp.

Loeffler et al., "Practical Fast 1-D DCT Algorithms With 11 Multiplications," IEEE, 1989, pp. 988-991.

Reznik, Y.A. et al., "Low-Drift Fixed-Point 8×8 IDCT Approximation with 8-Bit Transform Factors", Image Processing, 2007. ICIP 2007. IEEE International Conference on, IEEE, PI , Sep. 1, 2007, pp. VI-81, XP031158267, ISBN: 978-1-4244-1436-9 the whole document.

Taiwan Search Report—TW099120640—TIPO—Mar. 28, 2013.

Fuldseth A., et al., "Transform design for HEVC with 16 bit intermediate data representation", ITU-T SG16 WP3 and ISO/IEC JTC1/SC29/WG11, Document JCTVC-E243, 5th JCT-VC Meeting, Mar. 16-23, 2011, Geneva, CH, No. JCTVC-E243, Mar. 18, 2011, pp. 1-16; XP030048334.

Fuldseth A., et al., "Unified transform design for HEVC with 16 bit intermediate data representation", ITU-T SG16 WP3 and ISO/IEC JTC1/SC29/WG11, Document JCTVC-D224, 4th JCT-VC Meeting, Jan. 20-28, 2011, Daegu, KR, No. JCTVC-D224, Jan. 15, 2011, pp. 1-7; XP030008264, ISSN: 0000-0013.

Joshi, et al., "Efficient 16 and 32-point transforms," Joint Collaborative Team on Video Coding (JCT-VC) of ITU-T SG16 WP3 and ISO 6G16 WP3 and ISO.IEC JTCI/SC29/WG11, 4th Meeting: Daegu, KR, Jan. 20-28, 2011, 8 pp.

Joshi R et al: "CE10: Scaled orthogonal integer transforms supporting recursive factorization structure", 5. JCT-VC Meeting; 96. MPEG Meeting; Mar. 16, 2011-Mar. 23, 2011; Geneva ;( Joint Collaborative Team on Video Coding of ISO/IEC JTC1/ SC29/ WG11 and ITU-T SG. 16); URL:http://wftp3.itu.int/av-arch/jc tvc-site/, No. JCTVC-E370, Mar. 11, 2011, 8 pp.; XP030008876, ISSN: 0000-0005 the whole document.

Joshi R., et al., "CE10: Scaled orthogonal integer transforms supporting recursive factorization structure", ITU-T SG16 WP3 and ISO/IEC JTC1/SC29/WG11, Document JCTVC-F352 R1, 6th JCT-VC Meeting, Jul. 14-22, 2011, Torino, IT, No. JCTVC-F352 R1, Jul. 12, 2011, 12 pp.; XP030049338.

Joshi R., et al., "Recursive factorization for 16 and 32-point transforms using 4 and 8-point HM 3.0 core transforms", ITU-T SG16

(56) References Cited

OTHER PUBLICATIONS

WP3 and ISO/IEC JTC1/SC29/WG11, Document JCTVC-F592, 6th JCT-VC Meeting, Jul. 14-22, 2011, Torino, IT, No. JCTVC-F592, Jul. 18, 2011, 4 pp.; XP030049589.

Sadafale M., et al., "Low-complexity configurable transform architecture for HEVC", ITU-T SG16 WP3 and ISO/IEC JTC1/SC29/WG11, Document JCTVC-C226, 3rd JCT-VC Meeting, Oct. 7-15, 2010, Guangzhou, CN, No. JCTVC-C226, Oct. 2, 2010, 4 pp.; XP030007933, ISSN: 0000-0019.

Artieri A ., et al., "A one chip VLSI for real time two-dimensional discrete cosine transform", 1988 IEEE International Symposium on Circuits and Systems (ISCAS'88), Jun. 7-9, 1988, Espoo, Finland, Jun. 7, 1988, pp. 701-704, XP010069645.

Beaulieu, et al., "Multi-Spectral Image Resolution Refinement Using Stationary Wavelet Transform With Marginal and Joint Statistics Modeling," Department de R-D, Centre de Recherche Informatique de Montreal, pp. 9. Geoscience and Remote Sensing Symposium 2003, IGARSS ' 03.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-11003_d21, pp. 290.

Chan S-C et al: "Fast algorithms for computing the discrete cosine transform", IEEE Transactions on Circuits and Systems II : Analog and Digital Signal Processing, vol. 39, No. 3, Mar. 1992, pp. 185-190, XP000305256, ISSN: 1057-7130, DOI: 10.1109/82.127302.

Chivukula R K: "Fast algorithms for MDCT and low delay filterbanks used in audio coding", Master's Thesis, Electrical Engineering, The University of Texas at Arlington, USA, Aug. 8, 2008, XP007906591,Retrieved from the Internet:URL:http://dspace.uta.edu/handle/10106/921.

Dai X et al: "Fast algorithm for modulated complex lapped transform", IEEE Signal Processing Letters, vol. 16, No. 1, Jan. 2009, pp. 30-33, XP011239818, ISSN: 1070-9908, DOI : 10.1109/LSP.2008.2008434.

Dong et al., "2-D order-16 integer transforms for HD video coding", IEEE Transactions on Circuits and Systems for Video Technology, Oct. 2009, pp. 1462-1474, vol. 19, No. 10, XP011270110, ISSN: 1051-8215, DOI: 10. 1109/ TCSVT.2009.2026792.

Graps, "An Introduction to Wavelets," IEEE Computational Science and Engineering , Summer 1995, vol. 2, No. 2, 18 pp.

Karczewicz et al., "Video coding technology proposal by Qualcomm", ITU-T SG16 WP3 and ISO/IEC JTC1/SC29/WG11, Document JCTVC-A121, 1st JCT-VC Meeting, Apr. 15-23, 2010, Dresden, Germany, May 18, 2010, pp. 1-24, XP030007567, Retrieved from the Internet: URL: http://wftp3.itu.int/av-arch/jctvc-site/2010_04_A_Dresden/JCTVC-A121.zip.

Kok, C.W.: "Fast Algorithm for Computing Discrete Cosine Transform," IEEE Transactions on Signal Processing, IEEE Service Center, New York, NY, US, vol. 45, No. 3 , XP011057726 ISSN: 1053-587X, pp. 757-760 (Mar. 1, 1997).

Malvar H.S., et al., "Low-Complexity Transform and Quantization in H.264/AVC," IEEE Transactions on Circuits and Systems for Video Technology, Jul. 2003, pp. 598-603, vol. 13 (7), XP011099252, ISSN: 1051-8215, DOI: 10.1109/ TCSVT.2003.814964.

Plonka et al., "Fast and numerically stable algorithms for discrete cosine transforms", Linear Algebra and Applications, Jan. 2005, pp. 309-345, vol. 394 No. 1, XP004613691, ISSN: 0024-3795, DOI: 10.1016/J. LAA.2004.07.015.

Reznik Y A et al: "Fast 15×15 transform for image and video coding applications", Data Compression Conference 2009 (DCC '09), Mar. 16-18, 2009, Snowbird, UT, USA, Mar. 16, 2009, p. 465, XP031461157, ISBN: 978-1-4244-3753-5.

Wiegand et al., "WD3: Working Draft 3 of High-Efficiency Video Coding," Document JCTVC-E603, 5th Meeting: Geneva, CH, Mar. 16-23, 2011,193 pp.

Wiegand T. et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].

Xiong et at., "A Comparative Study of DCT-and Wavelet-Based image Coding," IEEE Transactions on Circuits and Systems for Video Technology. vol. 9, No. 5, Aug. 1999, pp. 692-695.

Yuriy Reznik, et al., "Fast Algorithms for Computation of 5-Point DCT-II, DCT-IV, and DST-IV, and Architectures," U.S. Appl. No. 12/334,238, filed Dec. 12, 2008.

Yuriy Reznik, et al., "Low-Complexity Transforms for Data Compression and Decompression," U.S. Appl. No. 12/349,406, filed Jan. 6, 2009.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Hong Y.M., et al., "Low-complexity 16x16 and 32x32 transforms and partial frequency transform," JCTVC-C209, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, pp. 1-11.

Wiegand T et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Artieri A., et al., "A one chip VLSI for real time two-dimensional discrete cosine transform", 1988 IEEE International Symposium on Circuits and Systems (ISCAS'88), Jun. 7-9, 1988, Espoo, Finland, Jun. 7, 1988, pp. 701-704, XP010069645.

Beaulieu, et al., "Multi-Spectral Image Resolution Refinement Using Stationary Wavelet Transform With Marginal and Joint Statistics Modeling," Department de R-D, Centre de Recherche Informatique de Montreal, pp. 9, Jul. 2003.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chan, et al., "Direct methods for computing discrete sinusoidal transforms," Proc. IEE, vol. 137, Pt. F, No. 6, pp. 433-442, Dec. 1990.

Chan S-C et al: "Fast algorithms for computing the discrete cosine transform", IEEE Transactions on Circuits and Systems II: Analog and Digital Signal Processing, vol. 39, No. 3, Mar. 1992, pp. 185-190, XP000305256, ISSN: 1057-7130, DOI: 10.1109/82.127302.

Chivukula R K: "Fast algorithms for MDCT and low delay filterbanks used in audio coding", Master's Thesis, Electrical Engineering, The University of Texas at Arlington, USA, Aug. 8, 2008, XP007906591, Retrieved from the Internet:URL:http://dspace.uta.edu/handle/10106/921.

Dai X et al: "Fast algorithm for modulated complex lapped transform", IEEE Signal Processing Letters, vol. 16, No. 1, Jan. 2009, pp. 30-33, XP011239818, ISSN: 1070-9908, DOI: 10.1109/LSP.2008.2008434.

Dong et al., "2-D order—16 integer transforms for HD video coding", IEEE Transactions on Circuits and Systems for Video Technology, Oct. 2009, pp. 1462-1474, vol. 19, No. 10, XP011270110, ISSN: 1051-8215, DOI: 10. 1109/TCSVT.2009.2026792.

(56) References Cited

OTHER PUBLICATIONS

Feig E et al: "Scaled DCT's on input sizes that are composite", IEEE Transactions on Signal Processing, vol. 43, No. 1, Jan. 1995, pp. 43-50, XP000826361, I SSN: 1053-587X, DOI: 10.1109/78.365284.

Feig E., et al., "On the Multiplicative Complexity of Discrete Cosine Transforms (Corresp.)" IEEE Transactions on Information Theory, vol. 38, No. 4, pp. 1387-1391, (Jul. 1992).

Graps, "An Introduction to Wavelets," IEEE Computational Science and Engineering, Summer 1995, vol. 2, No. 2, 18 PP.

Heideman, M.T.: "Computation of an Odd-Length DCT from a Real-Valued DFT of the Same Length," IEEE Transactions on Signal Processing, IEEE Service Center, New York, NY, US, vol. 40, No. 1, pp. 54-64 (Jan. 1, 1992) XP000270173 ISSN: 1053-587X.

International Search Report and Written Opinion—PCT/US2010/039676—ISA/EPO—Apr. 5, 2012.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Joshi et al., "Efficient large size transforms for high-performance video coding", Applications of Digital Image Processing XXXIII, Sep. 7, 2010, pp. 77980W-1-77980W-7, vol. 7798, Proceedings of SPIE, XP055007446, ISSN: 0277-786X, DOI: 10.1117/12.862250.

Joshi et al., "Simplified transforms for extended block sizes", ITU-T SG16 Q6 (VCEG), Document VCEG-AL30, 38th VCEG Meeting, Jul. 6-10, 2009, Geneva, CH, Jul. 3, 2009, XP030003711, Retrieved from the Internet: URL: http://wftp3.itu.int/av-arch/video-site/0906_LG/VCEG-AL30.zip.

Karczewicz et al., "A hybrid video coder based on extended macroblock sizes, improved interpolation, and flexible motion representation", IEEE Transactions on Circuits and Systems for Video Technology, Dec. 2010, pp. 1698-1708, vol. 20, No. 12, XP011329406, ISSN: 1051-8215, DOI: 10. 1109/TCSVT.2010.2092614.

Karczewicz et al., "Video coding technology proposal by Qualcomm", ITU-T SG16 WP3 and ISO/IEC JTC1/SC29/WG11, Document JCTVC-A121, 1st JCT-VC Meeting, Apr. 15-23, 2010, Dresden, Germany, May 18, 2010, pp. 1-24, XP030007567, Retrieved from the Internet: URL: http://wftp3.itu.int/av-arch/jctvc-site/2010_04_A_Dresden/JCTVC-A121.zip.

Kok, C.W.: "Fast Algorithm for Computing Discrete Cosine Transform," IEEE Transactions on Signal Processing, IEEE Service Center, New York, NY, US, vol. 45, No. 3, XP011057726 ISSN: 1053-587X, pp. 757-760 (Mar. 1, 1997).

Malvar H.S., et al., "Low-Complexity Transform and Quantization in H.264/AVC," IEEE Transactions on Circuits and Systems for Video Technology, Jul. 2003, pp. 598-603, vol. 13 (7), XP011099252, ISSN: 1051-8215, DOI: 10.1109/TCSVT.2003.814964.

Ohm et al., "Special Section on the Joint Call for Proposals on High Efficiency Video Coding (HEVC) Standardization", IEEE Transactions on Circuits and Systems for Video Technology, Dec. 2010, pp. 1661-1666, vol. 20, No. 12, XP011334854, ISSN: 1051-8215, DOI: 10. 1109/TCSVT.2010.2095692.

Plonka et al., "Fast and numerically stable algorithms for discrete cosine transforms", Linear Algebra and Applications, Jan. 2005, pp. 309-345, vol. 394 No. 1, XP004613691, ISSN: 0024-3795, DOI: 10.1016/J.LAA.2004.07.015.

Rao, et al., "Discrete Cosine Transform: Algorithms, Advantages, Applications," Academic Press, San Diego, 1990, 490 pp.

Reznik et al., "Improved precision of fixed-point algorithms by means of common factors", IEEE International Conference on Image Processing (ICIP-2008), Oct. 12-15, 2008, pp. 2344-2347, XP031374509, ISBN: 978-1-4244-1765-0.

Reznik Y A et al: "Design of fast transforms for high-resolution image and video coding", Applications of Digital Image Processing XXXII, Proceedings of SPIE, vol. 7443, Sep. 2, 2009, pp. 744312-1-744312-17, XP55007444.

Reznik Y A et al: "Fast 15x15 transform for image and video coding applications", Data Compression Conference 2009 (DCC '09), Mar. 16-18, 2009, Snowbird, UT, USA, Mar. 16, 2009, p. 465, XP031461157, ISBN: 978-1-4244-3753-5.

Reznik Y A: "On fast algorithm for computing even-length DCT", arXiv: 1001.3713v1 [cs.DS], Jan. 21, 2010, XP55007457, Retrieved from the Internet: URL: http://arxi v.org/PS-cache/arxiv/pdf/1001/1001.3713v1.pdf [retrieved on Sep. 19, 2011].

Reznik Y.A., et al., "On complexity of size 960 transform in AAC family of codecs", ISO/IEC JTC1/SC29/WG11 M16443, Apr. 2009, Maui, HI, USA, Apr. 17, 2009, XP030045040, section 2.

Tan Li et al: "A unified computing kernel for MDCT/IMDCT in modern audio coding standards", Proceedings of International Symposium on Communications and Information Technologies 2007 (ISCIT 07), Oct. 17-19, 2007, Sidney, Australia, Oct. 17, 2007, pp. 546-550, XP031166524, DOI: 10.1109/ISCIT.2007.4392079 ISBN: 978-1-4244-0976-1.

Wiegand et al., "WD3: Working Draft 3 of High-Efficiency Video Coding," Document JCTVC-E603, 5th Meeting: Geneva, CH, Mar. 16-23, 2011, 193 pp.

Wiegand T. et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].

Xiong et at., "A Comparative Study of DCT—and Wavelet-Based image Coding," IEEE Transactions on Circuits and Systems for Video Technology. vol. 9, No. 5, Aug. 1999, pp. 692-695.

Yuriy Reznik, et al., "Fast Algorithms for Computation of 5-Point DCT-II, DCT-IV, and DST-IV, and Architectures," U.S. Appl. No. 12/334,238. Dec. 12, 2008.

Yuriy Reznik, et al., "Low-Complexity Transforms for Data Compression and Decompression," U.S. Appl. No. 12/349,406. Jan. 6, 2009.

* cited by examiner

16-POINT TRANSFORM FOR MEDIA DATA CODING

This application claims the benefit of U.S. Provisional Application No. 61/219,885, filed Jun. 24, 2009, the entire content of which is incorporated herein by reference.

The present Application for Patent is related to the following co-pending U.S. Patent Application:

16-POINT TRANSFORM FOR MEDIA DATA CODING, having Ser. No. 12/820,357, filed concurrently herewith, assigned to the assignee hereof and expressly incorporated by reference herein.

TECHNICAL FIELD

This disclosure relates to data compression and, more particularly, data compression involving transforms.

BACKGROUND

Data compression is widely used in a variety of applications to reduce consumption of data storage space, transmission bandwidth, or both. Example applications of data compression include visible or audible media data coding, such as digital video, image, speech, and audio coding. Digital video coding, for example, is used in a wide range of devices, including digital televisions, digital direct broadcast systems, wireless communication devices, personal digital assistants (PDAs), laptop or desktop computers, tablet computers, digital cameras, digital recording devices, video gaming devices, cellular or satellite radio telephones, or the like. Digital video devices implement video compression techniques, such as MPEG-2, MPEG-4, or H.264/MPEG-4 Advanced Video Coding (AVC), to transmit and receive digital video more efficiently.

Video compression techniques may perform spatial prediction, motion estimation and motion compensation to reduce or remove redundancy inherent in video data. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching video blocks between two or more adjacent frames. Motion estimation generates motion vectors, which indicate the displacement of video blocks relative to corresponding video blocks in one or more reference frames. Motion compensation uses the motion vector to generate a prediction video block from a reference frame. After motion compensation, a residual video block is formed by subtracting the prediction video block from the original video block.

A video encoder then applies a transform followed by quantization and lossless statistical coding processes to further reduce the bit rate of the residual block produced by the video coding process. In some instances, the applied transform comprises a discrete cosine transform (DCT). Typically, the DCT is applied to video blocks whose size is a power of two, such as a video block that is 16 pixels high by 16 pixels wide (which is often referred to as a "16×16 video block"). These DCTs may, therefore, be referred to as 16-point DCTs in that these DCTs are applied to 16×16 video blocks to produce a 16-point array of DCT coefficients. The 16-point array of DCT coefficients produced from applying a 16-point DCT to the residual block then undergo quantization and lossless statistical coding processes (commonly known as "entropy coding" processes) to generate a bitstream. Examples of statistical coding processes include context-adaptive variable length coding (CAVLC) or context-adaptive binary arithmetic coding (CABAC). A video decoder receives the encoded bitstream and performs lossless decoding to decompress residual information for each of the blocks. Using the residual information and motion information, the video decoder reconstructs the encoded video.

SUMMARY

In general, this disclosure is directed to techniques for coding data, such as media data, using an implementation of a 16-point discrete cosine transform (DCT) capable not only of performing a 16-point DCT but multiple different DCTs of different sizes. As one example, the 16-point DCT implementation constructed in accordance with the techniques of this disclosure performs a DCT of size 16 and includes at least one 8-point DCT implementation that performs a DCT of size 8 and at least one DCT implementation that performs a DCT of size 4. In another example, the 16-point DCT implementation constructed in accordance with the techniques of this disclosure performs a linear DCT of size 16 and includes at least one 8-point DCT implementation that performs a linear DCT of size 8 and at least two 4-point DCT implementations that each perform a linear DCT of size 4, which may operate concurrently with one another. Moreover, the 8-point DCT implementation may include yet another 4-point DCT implementation that performs another linear DCT of size 4, which may operate concurrently with the 4-point DCTs performed by the at least two 4-point DCT implementations. Consequently, the 16-point DCT implementation constructed in accordance with the techniques of this disclosure may incorporate a number of different DCT implementations of varying sizes, which may consume significantly less chip-area in comparison to the chip-area conventionally consumed by each of the separate 16-point, 8-point and 4-point DCT implementations.

These linear DCTs may be applied to a video block of any given size by first applying one of these linear DCTs in one direction along the block, such as along the horizontal axis, and then applied in the other direction along the block, such as along the vertical axis. By applying these linear DCTs in this manner DCTs of varying sizes may be applied. For example, a 16-point DCT may be applied in one direction and an 8-point DCT may be applied in another direction to effectively apply a 16×8 or 8-point DCT depending on the size of the underlying video block. In this way, the linear DCTs may be applied to perform DCTs of size 16, 16×8, 8×16, 8×8, 8×4, 4×8 or any other combination of the foregoing linear sized DCTs.

In one aspect, an apparatus comprises a 16-point discrete cosine transform of type II (DCT-II) unit that performs a plurality of DCTs-II of different sizes that transform content data from a spatial domain to a frequency domain. The 16-point DCT-II unit includes a 8-point DCT-II unit that performs one of the plurality of DCTs-II of size 8 and a first 4-point DCT-II unit that performs one of the plurality of DCTs-II of size 4. The 8-point DCT-II unit includes the first 4-point DCT-II unit. The 16-point DCT-II unit also includes an 8-point DCT-IV unit comprising a second 4-point DCT-II unit and a third 4-point DCT-II unit, wherein each of the second and third 4-point DCT-II units performs one of the plurality of DCTs-II of size 4.

In another aspect, a method comprises receiving content data with a coding device; and performing one or more of a plurality of discrete cosine transforms of type-II (DCTs-II) that transform the received content data from a spatial domain to a frequency domain with a 16-point DCT-II unit included within the coding device. The 16-point DCT-II unit includes at least one 8-point DCT-II unit to perform one of the plurality of DCTs-II of size 8, a first 4-point DCT-II unit to perform one of the plurality of scaled DCTs-II of size 4 and an 8-point DCT-IV unit comprising a second 4-point DCT-II unit and a third 4-point DCT-II unit, wherein each of the second and third 4-point DCT-II units performs one of the plurality of scaled DCTs-II of size 4.

In another aspect, a non-transitory computer-readable storage medium comprises instructions that when executed cause a processor to receive content data with a coding device and perform one or more of a plurality of discrete cosine transforms of type-II (DCTs-II) that transform the received content data from a spatial domain to a frequency domain with a 16-point DCT-II unit included within the coding device. The 16-point DCT-II unit includes at least one 8-point DCT-II unit to perform one of the plurality of DCTs-II of size 8, a first 4-point DCT-II unit to perform one of the plurality of scaled DCTs-II of size 4, and an 8-point DCT-IV unit comprising a second 4-point DCT-II unit and a third 4-point DCT-II unit, wherein each of the second and third 4-point DCT-II units performs one of the plurality of scaled DCTs-II of size 4.

In another aspect, a device comprises means for receiving content data and means for performing one or more of a plurality of discrete cosine transforms of type-II (DCTs-II) that transform the received content data from a spatial domain to a frequency domain. The means for performing the one or more of a plurality of DCTs-II includes means for performing one of the plurality of DCTs-II of size 8, first means for performing a first one of the plurality of scaled DCTs-II of size 4, wherein the means for performing one of the plurality of DCTs-II of size 8 comprises the first means for performing one of the plurality of scaled DCTs-II of size 4, second means for performing a second one of the plurality of DCTs-II of size 4 and third means for performing a third one of the plurality of scaled DCTs-II of size 4.

In another aspect, an apparatus comprises a 16-point inverse discrete cosine transform (IDCT) unit that performs a plurality of IDCTs of different sizes that transform content data from a frequency domain to a spatial domain. The 16-point IDCT unit includes an 8-point IDCT unit that performs one of the plurality of IDCTs of size 8, a 4-point IDCT unit that performs one of the plurality of IDCTs of size 4, wherein the 8-point IDCT unit includes the 4-point IDCT unit, and an inverse 8-point DCT-IV unit that comprises a second 4-point IDCT unit and a third 4-point IDCT unit, each of which performs one of the plurality of IDCTs of size 4.

In another aspect, a method comprises receiving content data with a coding device and performing one or more of a plurality of inverse discrete cosine transforms (IDCTs) that transform the received content data from a frequency domain to a spatial domain with a 16-point IDCT unit included within the coding device. The 16-point IDCT unit includes at least one 8-point IDCT unit to perform one of the plurality of IDCTs of size 8, a first 4-point IDCT unit to perform one of the plurality of IDCTs of size 4, wherein the at least one 8-point IDCT unit includes the first 4-point IDCT unit, and an inverse 8-point DCT-IV unit comprising a second 4-point IDCT unit and a third 4-point IDCT unit, each of which performs one of the plurality of IDCTs of size 4.

In another aspect, a non-transitory computer-readable storage medium comprises instructions that when executed cause a processor to receive content data with a coding device and perform one or more of a plurality of inverse discrete cosine transforms (IDCTs) that transform the received content data from a frequency domain to a spatial domain with a 16-point IDCT unit included within the coding device. The 16-point IDCT unit includes at least one 8-point IDCT unit to perform one of the plurality of IDCTs of size 8, a first 4-point IDCT unit to perform one of the plurality of scaled IDCTs of size 4, wherein the at least one 8-point IDCT unit includes the first 4-point IDCT unit and an inverse 8-point DCT-IV unit comprising a second 4-point IDCT unit and a third 4-point IDCT unit, each of which performs one of the plurality of IDCTs of size 4.

In another aspect, a device comprises means for receiving content data and means for performing one or more of a plurality of inverse discrete cosine transforms that transform the received content data from a frequency domain to a spatial domain. The means for performing the one or more of a plurality of IDCTs includes means for performing one of the plurality of IDCTs-II of size 8, first means for performing a first one of the plurality of scaled IDCTs-II of size 4, wherein the means for performing one of the plurality of IDCTs-II of size 8 comprises the first means for performing one of the plurality of scaled IDCTs-II of size 4, second means for performing a second one of the plurality of IDCTs-II of size 4 and third means for performing a third one of the plurality of scaled IDCTs-II of size 4.

The details of one or more aspects of the techniques are set forth in the accompanying drawings and the description below. Other features, objects, and advantages of the techniques described in this disclosure will be apparent from the description and drawings, and from the claims.

DETAILED DESCRIPTION

Figure 1:
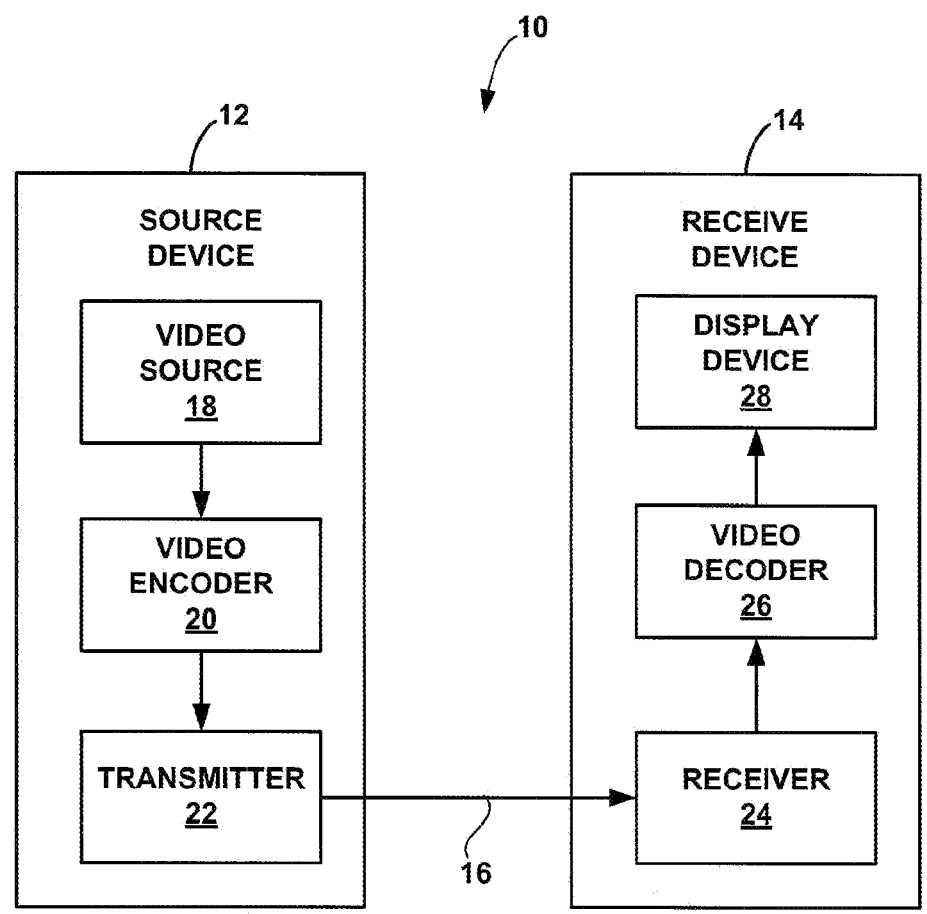
FIG. 1 is a block diagram illustrating a video encoding and decoding system that may implement techniques of this disclosure.

In general, this disclosure is directed to techniques for coding data using a 16-point discrete cosine transforms (DCTs) implementation that includes a number of different DCT implementations capable of performing a number of different DCTs of different sizes. The techniques may be applied to compress a variety of data, including visible media data or audible media data, such as digital video data, image data, speech data, and/or audio data, and thereby transform such electrical signals representing such data into compressed signals for more efficient processing, transmission or archival of the electrical signals. The 16-point DCT implementation constructed in accordance with the techniques of this disclosure is, therefore, capable of performing DCTs of multiple sizes. By performing DCTs of multiple sizes, the 16-point DCT implementation potentially eliminates separate DCT implementations to perform the DCTs of similar sizes. Consequently, the described techniques may promote reduced consumption of so-called "board space," as the 16-point DCT implementation constructed in accordance with the techniques incorporates, nests or otherwise embeds DCT implementations of different sizes, such as 8 and 4, without substantially increasing the size of the 16-point implementation in comparison to the total size of separate 16-point, 8-point and 4-point DCT implementations. Consuming less board space generally translates into a reduction of power consumption and, as a result, the techniques of this disclosure may promote more energy efficient DCT implementations.

The sizes denoted above, i.e., 16, 8 and 4, are represented in terms of discrete data units. To illustrate, video data is often described in terms of video blocks, particularly with respect to video compression. A video block generally refers to any sized portion of a video frame, where a video frame refers to a picture or image in a series of pictures or images. Each video block typically comprises a plurality of discrete pixel data that indicates either color components, e.g., red, blue and green, (so-called "chromaticity" or "chroma" components) or luminance components (so-called "luma" components). Each set of pixel data comprises a single pixel in the video block and may be considered a discrete data unit with respect to video blocks. Thus, an 8×8 video block, for example, comprises eight rows of pixel data with eight discrete sets of pixel data in each row. An n-bit value may be assigned to each pixel to specify a color or luminance value.

DCTs are commonly described in terms of the size of the block of data, whether audio, speech image or video data, the DCT is capable of processing. For example, if a DCT can process a 16 array of data, the DCT may be referred to as a linear 16-point DCT. Linear DCTs of different sizes may be applied to effectively perform 16×16, 16×8, 8×16, 8×8, 8×4, 4×8, 4×4 or any other combination of sizes to different sized video blocks. Moreover, DCTs may be denoted as a particular type. The most commonly employed type of DCT of the eight different types of DCTs is a DCT of type-II, which may be denoted as "DCT-II." Often, when referring generally to a DCT, such reference refers to a DCT of type-II or DCT-II. The inverse of a DCT-II is referred to as a DCT of type-III, which similarly may be denoted as "DCT-III" or, with the common understanding that DCT refers to a DCT-II, as "IDCT" where the "I" in "IDCT" denotes inverse. Reference to DCTs below conforms to this notation, where general reference to DCTs refers to a DCT-II unless otherwise specified. However, to avoid confusion, DCTs, including DCTs-II, are referred to below with the corresponding type (II, III, etc.) indicated.

The techniques described in this disclosure may be implemented in an encoder and/or decoder that employ one or more implementations of the 16-point DCTs-II and/or 16-point DCTs-III, respectively, to facilitate compression and/or decompression of data. Again, the compression and decompression accomplished by applying these 16-point DCT-II implementations permits physical transformation of electrical signals representing the data such that the signals can be processed, transmitted, and/or stored more efficiently using physical computing hardware, physical transmission media (e.g., copper, optical fiber, wireless, or other media), and/or storage hardware (e.g., magnetic or optical disk or tape, or any of a variety of solid state media). The implementations may be configured solely in hardware or may be configured in a combination of hardware and software.

The implementations of the 16-point DCTs-II may be scaled, where the term "scaled" refers to a DCT implementation that produces scaled DCT coefficients. Scaled DCT coefficients, when multiplied by corresponding scale factors produce the so-called "full" DCT coefficients. A scaled DCT implementation represents a DCT implementation having certain factors removed from the implementation. Generally, these factors are incorporated into another element, module, or unit of a given coding device or system. For example, a video encoder may include a scaled 16-point DCT implementation constructed in accordance with the techniques of this disclosure. The video encoder generally incorporates the removed factors into a quantization unit, which quantizes the scaled DCT coefficients output by the scaled 16-point DCT implementation. The quantization unit may generally apply these factors without substantially increasing the complexity of the quantization unit, while a full DCT implementation that applies these factors is generally more complex than a scaled DCT implementation in combination with another module that applies the factors, such as the quantization unit. Consequently, scaled DCT implementations, in certain contexts, may provide for reduced implementation complexity while providing the same coding gain. While described in this disclosure with respect to scaled DCT implementations, the techniques may be applied to non-scaled or so-called "full" DCT implementations.

To illustrate, an apparatus may include the 16-point DCT implementation constructed in accordance with the techniques of this disclosure in the form of a 16-point DCT transform module. The 16-point DCT transform module may perform a number of scaled DCT transforms of different sizes to transform content data from a spatial domain to a frequency domain. The scaled 16-point DCT module may include at least one scaled 8-point DCT module that performs a first one of the number of scaled DCT transforms of size 8. The 16-point DCT module may also include at least one scaled 4 transform module that performs at least a second one of the number of scaled DCT transforms of size 4.

In this respect, the 16-point DCT implementation constructed in accordance with the techniques of this disclosure may be capable, at least in some aspects, of performing DCTs of multiple sizes, thereby potentially eliminating separate DCT implementations to perform the DCTs of the multiple sizes. Consequently, the techniques of this disclosure promote reduced consumption of so-called "board space," as the 16-point DCT implementation constructed in accordance with the techniques incorporates, nests or otherwise embeds DCT implementations of different sizes, such as 8 and 4, without substantially increasing the size of the 16-point implementation. In comparison to the total size of separate 16-point, 8-point and 4-point DCT implementations, the 16-point DCT-II implementation of this disclosure may be substantially smaller in terms of physical board space consumed, where the term board space refers to an amount of space consumed on a silicon or other physical board that provides interconnections between different components. Consuming less board space generally translates into a reduction of power consumption and, as a result, the techniques of this disclosure may promote more energy efficient DCT implementations.

FIG. 1 is a block diagram illustrating a video encoding and decoding system 10. As shown in FIG. 1, system 10 includes a source hardware device 12 that transmits encoded video to a receive hardware device 14 via a communication channel 16. Source device 12 may include a video source 18, video encoder 20 and a transmitter 22. Destination device 14 may include a receiver 24, video decoder 26 and video display device 28.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony. For other data compression and coding applications, devices 12, 14 could be configured to send and receive, or exchange, other types of data, such as image, speech or audio data, or combinations of two or more of video, image, speech and audio data. Accordingly, the following discussion of video applications is provided for purposes of illustration and should not be considered limiting of the various aspects of the disclosure as broadly described herein.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones. Hence, in some aspects, source device 12, receive device 14 or both may form a wireless communication device handset, such as a mobile telephone. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display (LCD), plasma display or organic light emitting diode (OLED) display.

Video encoder 20 and video decoder 26 may be configured to support scalable video coding for spatial, temporal and/or signal-to-noise ratio (SNR) scalability. In some aspects, video encoder 20 and video decoder 26 may be configured to support fine granularity SNR scalability (FGS) coding. Encoder 20 and decoder 26 may support various degrees of scalability by supporting encoding, transmission and decoding of a base layer and one or more scalable enhancement layers. For scalable video coding, a base layer carries video data with a minimum level of quality. One or more enhancement layers carry additional bitstream to support higher spatial, temporal and/or SNR levels.

Video encoder 20 and video decoder 26 may operate according to a video compression standard, such as MPEG-2, MPEG-4, ITU-T H.263, or ITU-T H.264/MPEG-4 Advanced Video Coding (AVC). Although not shown in FIG. 1, in some aspects, video encoder 20 and video decoder 26 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, each of video encoder 20 and video decoder 26 may be implemented at least partially as an integrated circuit (IC) chip or device, and included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various dyadic block sizes, such as 16×6, 8×8, 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components.

Smaller video blocks can provide better resolution, and may be used for locations of a video frame that include high levels of detail. In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16×16 area of pixels. A luminance block may comprise a 16×16 set of values, but may be further partitioned into smaller video blocks, such as 8×8 blocks, 4×4 blocks, 8×4 blocks, 4×8 blocks or other sizes. Two different chrominance blocks may define color for the macroblock, and may each comprise 8×8 sub-sampled blocks of the color values associated with the 16×16 area of pixels. Macroblocks may include syntax information to define the coding modes and/or coding techniques applied to the macroblocks.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. In this disclosure, the term "coded unit" refers to any independently decodable unit of a video frame such as an entire frame, a slice of a frame, a group of pictures (GOPs), or another independently decodable unit defined according to the coding techniques used.

Video encoder 20 and/or video decoder 26 of system 10 of FIG. 1 may be configured to include an implementation of a 16-point DCT-II and an inverse thereof (e.g., a 16-point DCT-III), respectively, wherein the 16-point DCT-II implementation is constructed in accordance with the techniques described in this disclosure. While ITU-T H.264 standard supports intra prediction in various block sizes, such as 16×16, 8×8, 4×4 for luma components, and 8×8 for chroma components, revisions to this standard to improve coding efficiency are currently underway. One revised standard proposed by the Joint Collaborative Team-Video Coding (JCT- VC), which is a collaboration between MPEG and ITU-T, may be referred to as High Efficiency Video Coding (HEVC). In some instances, 16-point DCTs of type-II ("DCTs-II") implementations constructed in accordance with the techniques of this disclosure may preserve coding efficiency while also reducing implementation sizes, thereby consuming less physical board space and promoting power efficiency. Consequently, HEVC and other evolving standards or specifications may consider these DCTs-II and DCTs-III.

In accordance with the techniques described in this disclosure, implementations of 16-point DCTs-II provide a plurality of DCTs-II of different sizes. Video encoder 20 may include a 16-point DCT-II unit (which is not shown in FIG. 1 for ease of illustration purposes) that represents this 16-point DCT-II implementation. The 16-point DCT-II unit generally performs a plurality or number of scaled DCT transforms of different sizes to transform content data from a spatial domain to a frequency domain. As one example, the 16-point DCT-II unit may include at least one scaled 8-point DCT module that performs a first one of the scaled DCT transforms of size 8 and at least one scaled 4-point transform module that performs at least a second one of the DCT transforms of size 4.

In this respect, a single 16-point DCT-II implementation constructed in accordance with the techniques of this disclosure is capable, at least in some aspects, of performing DCTs of multiple sizes, thereby potentially eliminating separate DCT implementations to perform the DCTs of similar sizes. Accordingly, the techniques of this disclosure may promote reduced consumption of so-called "board space," which refers to the area of physical space consumed on a silicon board, as the 16-point DCT implementation constructed in accordance with the techniques incorporates, nests or otherwise embeds DCT implementations of different sizes, such as 8 and 4, without substantially increasing the size of the 16-point implementation. In comparison to the total size of separate 16-, 8- and 4-point DCT implementations, the 16-point DCT-II implementation may be substantially smaller in terms of physical board space consumed. Consuming less board space generally translates into a reduction of power consumption and, as a result, the techniques of this disclosure may promote more energy efficient DCT implementations.

The implementations of the 16-point DCTs-II constructed in accordance with the techniques of this disclosure may be scaled, where the term "scaled" refers to a DCT implementation that produces scaled DCT coefficients, not so-called "full" DCT coefficients. A scaled DCT implementation represents a DCT implementation having certain factors removed from the implementation. Generally, these removed factors are incorporated into another element, module, or unit of a given coding device or system. For example, a video encoder may include a scaled 16-point DCT implementation constructed in accordance with the techniques of this disclosure. The video encoder generally incorporate the removed factors into a quantization unit, which quantizes the scaled DCT coefficients output by the scaled 16-point DCT implementation. The quantization unit may generally apply these factors without substantially increasing the complexity of the quantization unit while a full DCT implementation that applies these factors is generally more complex than a scaled DCT implementation in combination with another module that applies the factors, such as the quantization unit. Consequently, scaled DCT implementations, in certain contexts, may provide for reduced implementation complexity while providing the same coding gain. While described in this disclosure with respect to scaled DCT implementations, the techniques may be applied to non-scaled or so-called "full" DCT implementations.

Figure 2:
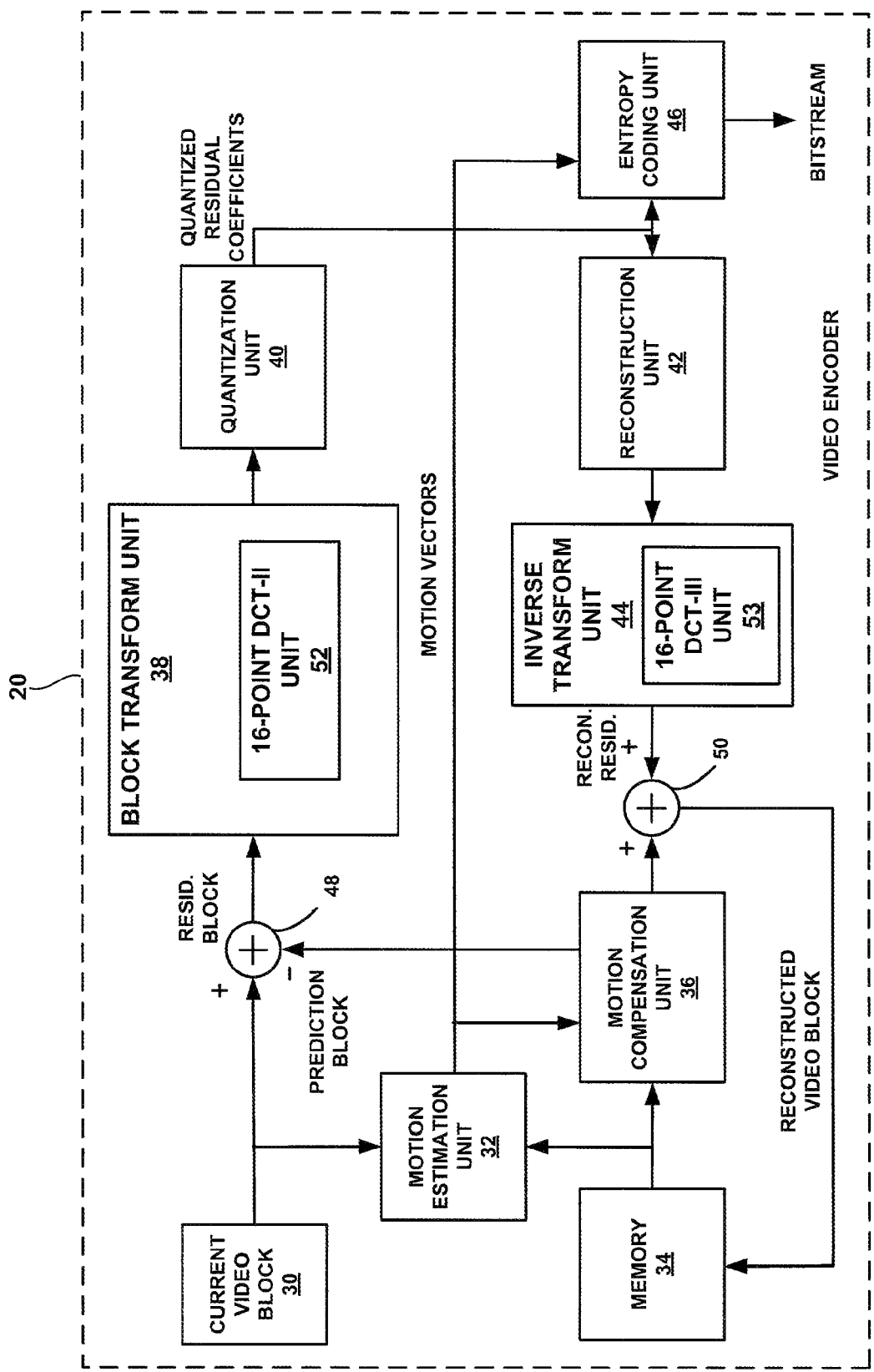
FIG. 2 is a block diagram illustrating the video encoder of FIG. 1 in more detail.

FIG. 2 is a block diagram illustrating video encoder 20 of FIG. 1 in more detail. Video encoder 20 may be formed at least in part as one or more integrated circuit devices, which may be referred to collectively as an integrated circuit device. In some aspects, video encoder 20 may form part of a wireless communication device handset or broadcast server. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 20 performs motion estimation to track the movement of matching video blocks between adjacent frames.

As shown in FIG. 2, video encoder 20 receives a current video block 30 within a video frame to be encoded. In the example of FIG. 2, video encoder 20 includes motion estimation unit 32, memory 34, motion compensation unit 36, block transform unit 38, quantization unit 40, inverse quantization unit 42, inverse transform unit 44 and entropy coding unit 46. An in-loop or post loop deblocking filter (not shown) may be applied to filter blocks to remove blocking artifacts. Video encoder 20 also includes summer 48 and summer 50. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 32 compares video block 30 to blocks in one or more adjacent video frames to generate one or more motion vectors. The adjacent frame or frames may be retrieved from memory 34, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV's) that indicate the magnitude and trajectory of the displacement between current video block 30 and one or more matching blocks from the reference frames used to code current video block 30. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 determines the best block partitions and generates a motion vector or motion vectors to identify a video block using certain criteria, such as a rate-distortion model. For example, there may be more than motion vector in the case of bi-directional prediction. Using the resulting block partitions and motion vectors, motion compensation unit 36 forms a prediction video block.

Video encoder 20 forms a residual video block by subtracting the prediction video block produced by motion compensation unit 36 from the original, current video block 30 at summer 48. Block transform unit 38 applies a transform producing residual transform block coefficients. As shown in FIG. 2, block transform unit 38 includes a 16-point DCT-II unit 52 that implements a 16-point DCT-II constructed in accordance with the techniques described in this disclosure. 16-point DCT-II unit 52 represents a hardware module, which in some instances executes software (such as a digital signal processor or DSP executing software code or instructions), that implements a 16-point DCT-II capable of performing one or more of a 16-point DCT-II, a 8-point DCT-II and 4-point DCT-II, as described in this disclosure. 16-point DCT-II unit 52 applies one or more of these DCTs-II of size 16, 8 and 4 to the residual block to produce a block of residual transform coefficients of a corresponding size 16, 8 and/or 4. 16-point DCT-II unit 52 generally transforms the residual block from the spatial domain, which is represented as residual pixel data, to the frequency domain, which is represented as DCT coefficients. The transform coefficients may comprise DCT coefficients that include at least one DC coefficient and one or more AC coefficients.

Quantization unit 40 quantizes (e.g., rounds) the residual transform block coefficients to further reduce bit rate. As mentioned above, quantization unit 40 accounts for the scaled nature of scaled 16-point DCT-II unit 52 by incorporating internal factors removed during factorization. As quantization typically involves multiplication, incorporating these factors into quantization unit 40 may not increase the implementation complexity of quantization unit 40. In this respect, removing the factors from scaled 16-point DCT-II unit 52 decreases the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 may perform statistical lossless coding, referred to in some instances, as entropy coding. Entropy coding unit 46 models a probability distribution of quantized DCT coefficients and selects a codebook (e.g., CAVLC or CABAC) based on the modeled probability distribution. Using this codebook, entropy coding unit 46 selects codes for each quantized DCT coefficient in a manner that compresses quantized DCT coefficients. To illustrate, entropy coding unit 46 may select a short codeword (in terms of bits) for frequently occurring quantized DCT coefficients and longer codeword (in term of bits) for less frequently occurring quantized DCT coefficients. So long as the short codeword uses less bits than the quantized DCT coefficients, on average entropy coding unit 46 compresses the quantized DCT coefficients. Entropy coding unit 46 outputs the entropy coded coefficients as a bitstream which is sent to video decoder 26. In general, video decoder 26 performs inverse operations to decode and reconstruct the encoded video from the bitstream, as will be described with reference to the example of FIG. 3.

Reconstruction unit 42 and inverse transform unit 44 reconstruct quantized coefficients and apply inverse transformation, respectively, to reconstruct the residual block. Inverse transform unit 44 includes an inverse DCT (IDCT), which is commonly referred to as a DCT of type III that performs the inverse operations of 16-point DCT-II unit 52, similar to 16-point DCT-III unit 68 described below with respect to FIG. 3. This inverse 16-point DCT-II is shown as 16-point DCT-III unit 53, which again may be substantially similar to 16-point DCT-III unit 68 shown in the example of FIG. 3. Summation unit 50 adds the reconstructed residual block to the motion compensated prediction block produced by motion compensation unit 36 to produce a reconstructed video block for storage in memory 34. The reconstructed video block is used by motion estimation unit 32 and motion compensation unit 36 to encode a block in a subsequent video frame.

Figure 3:
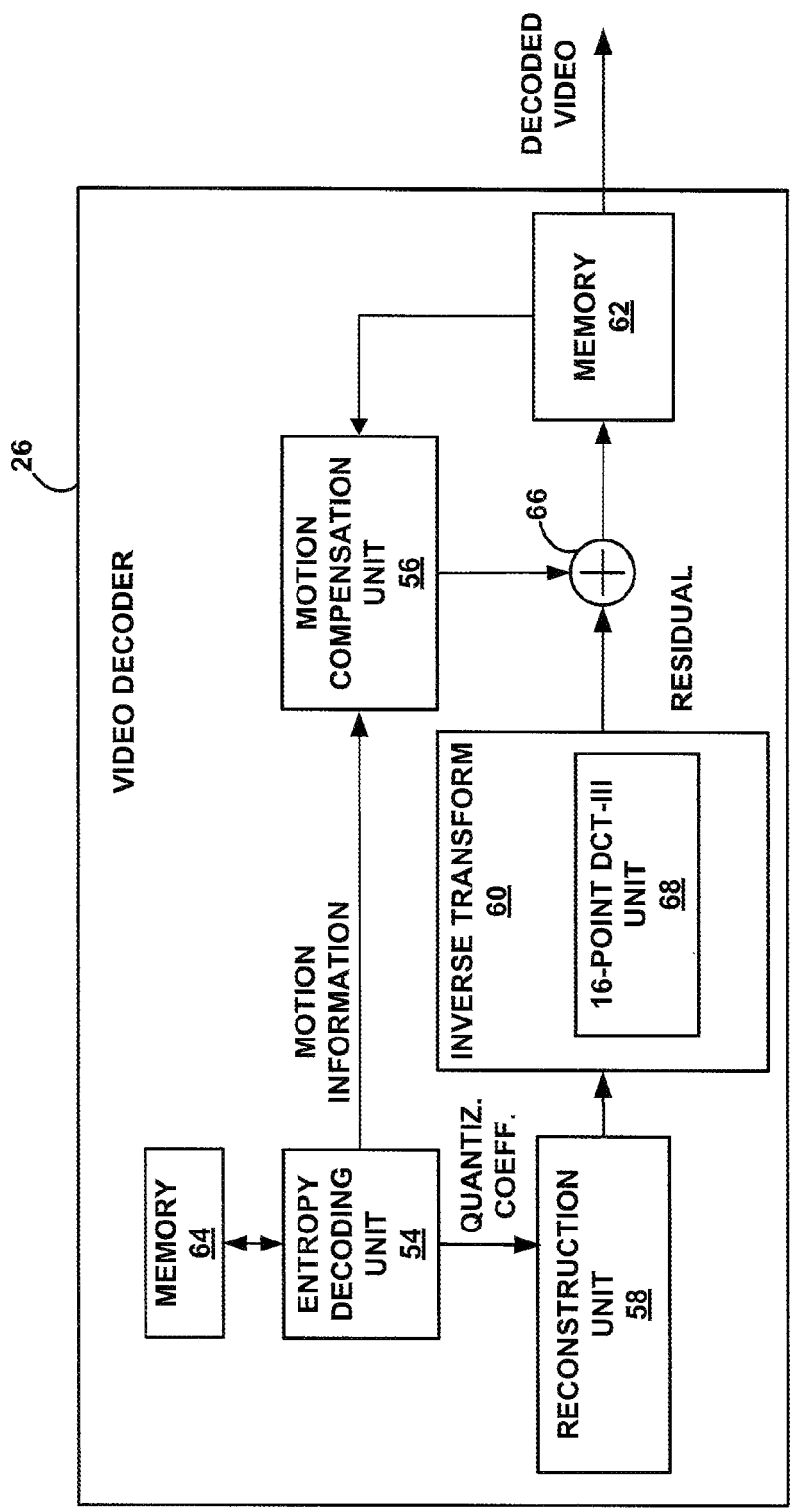
FIG. 3 is a block diagram illustrating the video decoder of FIG. 1 in more detail.

FIG. 3 is a block diagram illustrating an example of video decoder 26 of FIG. 1 in more detail. Video decoder 26 may be formed at least in part as one or more integrated circuit devices, which may be referred to collectively as an integrated circuit device. In some aspects, video decoder 26 may form part of a wireless communication device handset. Video decoder 26 may perform intra- and inter-decoding of blocks within video frames. As shown in FIG. 3, video decoder 26 receives an encoded video bitstream that has been encoded by video encoder 20. In the example of FIG. 3, video decoder 26 includes entropy decoding unit 54, motion compensation unit 56, reconstruction unit 58, inverse transform unit 60, and memory 62. Entropy decoding unit 54 may access one or more data structures stored in a memory 64 to obtain data useful in coding. Video decoder 26 also may include an in-loop or post loop deblocking filter (not shown) that filters the output of summer 66. Video decoder 26 also includes summer 66. FIG. 3 illustrates the temporal prediction components of video decoder 26 for inter-decoding of video blocks. Although not shown in FIG. 3, video decoder 26 also may include spatial prediction components for intra-decoding of some video blocks.

Entropy decoding unit 54 receives the encoded video bitstream and decodes from the bitstream quantized residual coefficients and quantized parameters, as well as other information, such as macroblock coding mode and motion information, which may include motion vectors and block partitions. Motion compensation unit 56 receives the motion vectors and block partitions and one or more reconstructed reference frames from memory 62 to produce a prediction video block.

Reconstruction unit 58 inverse quantizes, i.e., de-quantizes, the quantized block coefficients. Inverse transform unit 60 applies an inverse transform, e.g., an inverse DCT, to the coefficients to produce residual blocks. More specifically, inverse transform unit 60 includes a 16-point DCT-III unit 68, which inverse transform unit 60 applies to the coefficients to produce residual blocks. 16-point DCT-III unit 68, which is the inverse of 16-point DCT-II unit 52 shown in FIG. 2, may transform the coefficients from the frequency domain to the spatial domain to produce the residual blocks. Similar to quantization unit 40 above, reconstruction unit 58 accounts for a scaled nature of 16-point DCT-III unit 68 by incorporating the external factors removed during factorization into the reconstruction process with little if any increase in implementation complexity. Removing factors from scaled 16-point DCT-III unit 68 may reduce implementation complexity, thereby resulting in a net decrease of complexity for video decoder 26.

The prediction video blocks are then summed by summer 66 with the residual blocks to form decoded blocks. A deblocking filter (not shown) may be applied to filter the decoded blocks to remove blocking artifacts. The filtered blocks are then placed in memory 62, which provides reference frame for decoding of subsequent video frames and also produces decoded video to drive display device 28 (FIG. 1). In some instances, a post loop deblocking filter may be applied to filter frames after they are stored to memory 62 to remove artifacts.

Figure 4A:
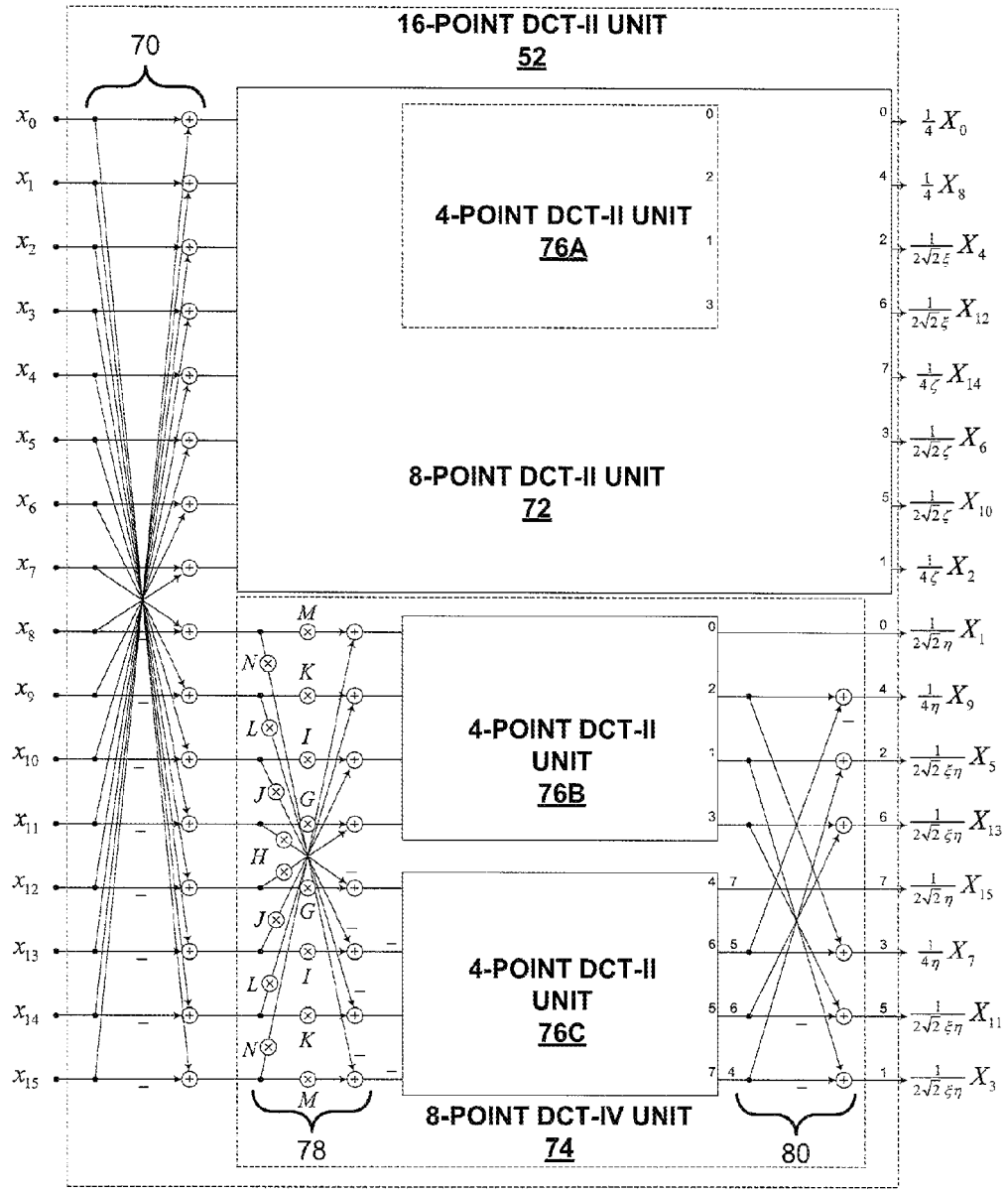
FIGS. 4A-4D are diagrams that illustrate various aspects of the 16-point DCT-II unit of FIG. 2 in more detail.

FIGS. 4A-4D are diagrams that illustrate various aspects of 16-point DCT-II unit 52 in more detail. In the example of FIG. 4A, 16-point DCT-II unit 52 includes a butterfly unit 70, an 8-point DCT-II unit 72 and an 8-point DCT-IV unit 74.

8-point DCT-II unit 72 includes a first 4-point DCT-II unit 76A, while 8-point DCT-IV unit 74 includes a second 4-point DCT-II unit 76B and a third 4-point DCT-II unit 76C. 8-point DCT-IV unit 74 also includes a factor multiplication unit 78 and a cross-additive unit 80, which are described below in more detail with respect to the example of FIG. 4D. 16-point DCT-II unit 52 receives inputs $x_0$-$x_{15}$ and generates outputs $X_0$-$X_{15}$. Butterfly unit 70 rearranges inputs $x_0$-$x_{15}$ into even inputs $x_0, x_2, x_4, x_6, x_8, x_{10}, x_{12}$, and $x_{14}$ and odd inputs $x_1, x_3, x_5, x_7, x_9, x_{11}, x_{13}$, and $x_{15}$, while also performing cross-additions with respect to the even inputs and cross-subtractions with respect to the odd inputs. Butterfly unit 70 outputs the cross-added even inputs to 8-point DCT-II unit 72 and the cross-subtracted odd inputs to 8-point DCT-IV unit 74.

Figure 4B:
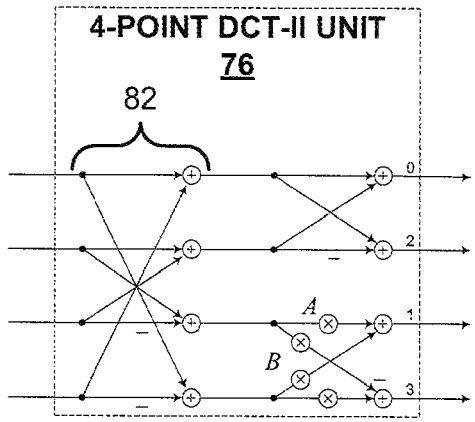

FIG. 4B is a diagram that illustrates an example of any one of 4-point DCT-II unit 76A-76C in more detail. To reflect that the 4-point DCT-II unit shown in the example of FIG. 4B may represent any one of 4-point DCT-II units 76A-76C, the 4-point DCT-II unit shown in the example of FIG. 4B is generally referred to as 4-point DCT-II unit 76. 4-point DCT-II unit 76 includes a butterfly unit 82 that is substantially similar to butterfly unit 70 in terms of functionality, but different in terms of scale as butterfly unit 82 only receives four inputs instead of 16. Butterfly unit 82 rearranges the inputs into even and odd inputs, as denoted by the '0' and '2' notation on the two upper outputs and the '1' and '3' notation on the two lower outputs. The portion of 4-point DCT-II unit 76 that operates on the odd inputs may be referred to as the odd portion while the portion that operates on the even inputs may be referred to as the even portion.

In the odd portion, two factors denoted A and B are shown to be applied to the odd inputs. In determining the value of these factors, a designer may balance a number of concerns. Often, factors that are a power of two can be easily performed considering that a multiplication by a factor that is a power of two normally involves only a right shift in a binary system. Consequently, factors that are a power of two are favored, although such factors may not adequately reflect DCT coefficients with sufficient precision to provide significant coding gain or compression efficiency. Alternatively, factors that are not a power of two may provide more precision but may not be as easily implemented, thereby increasing implementation complexity. Moreover, larger factors generally provide more coding gain but require significant more storage space while smaller factors may consume less storage space but provide less coding gain. In any event, a number of tradeoffs are involved in selecting factors for any given DCT implementation, such as the DCT implementation represented by 4-point DCT-II unit 76. Various combinations of factors are described below that illustrate these various tradeoffs in more detail.

Figure 4C:
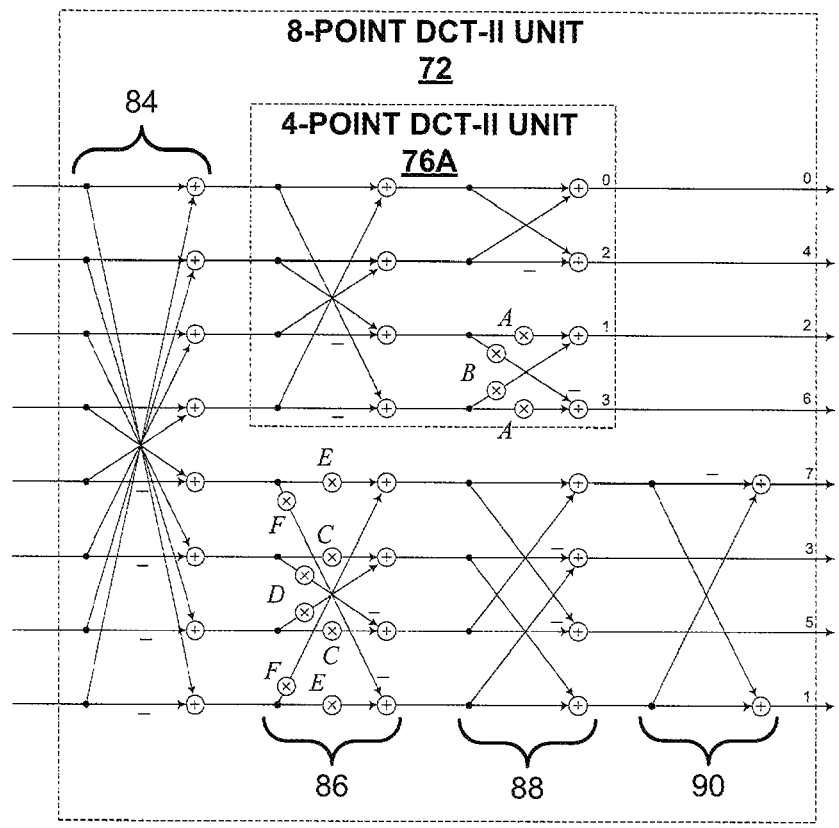

FIG. 4C is a block diagram illustrating 8-point DCT-II unit 72 in more detail. In the example of FIG. 4C, 8-point DCT-II unit 72 includes a butterfly unit 84 that is substantially similar to butterfly units 70 and 82 in function, but different in scale, considering that butterfly unit 84 receives only 8 inputs in comparison to the 16 and 4 inputs received by butterfly units 70 and 82, respectively. In any event, butterfly unit 84 rearranges its inputs into even and odd inputs while also performing cross-additions to generate the even inputs and cross-subtractions to generate the odd inputs. The portion of 8-point DCT-II unit 72 that operates on the even inputs may be referred to as the even portion while the portion that operates on the odd inputs may be referred to as the odd portion. The even portion in this instance comprises a nested 4-point DCT-II unit 76A, which is substantially similar to 4-point DCT-II unit 76 described above with respect to the example of FIG. 4B.

The odd portion of 8-point DCT-II unit 72 includes a number of units 86-90 that each perform various mathematical operations. Factor multiplication unit 86 performs cross additions of the odd inputs after multiplying these inputs by factors C, D, E, and F. Factors C, D, E, and F represent variables that can be modified in the manner described above to promote various benefits. Cross-addition unit 88 performs a cross addition in the manner shown with respect to the example of FIG. 4C while cross-addition unit 90 performs cross-addition of the outer add inputs to generate odd outputs denoted 7 and 1. Again, various combinations of the factors are described below that illustrate these various tradeoffs in more detail.

Figure 4D:
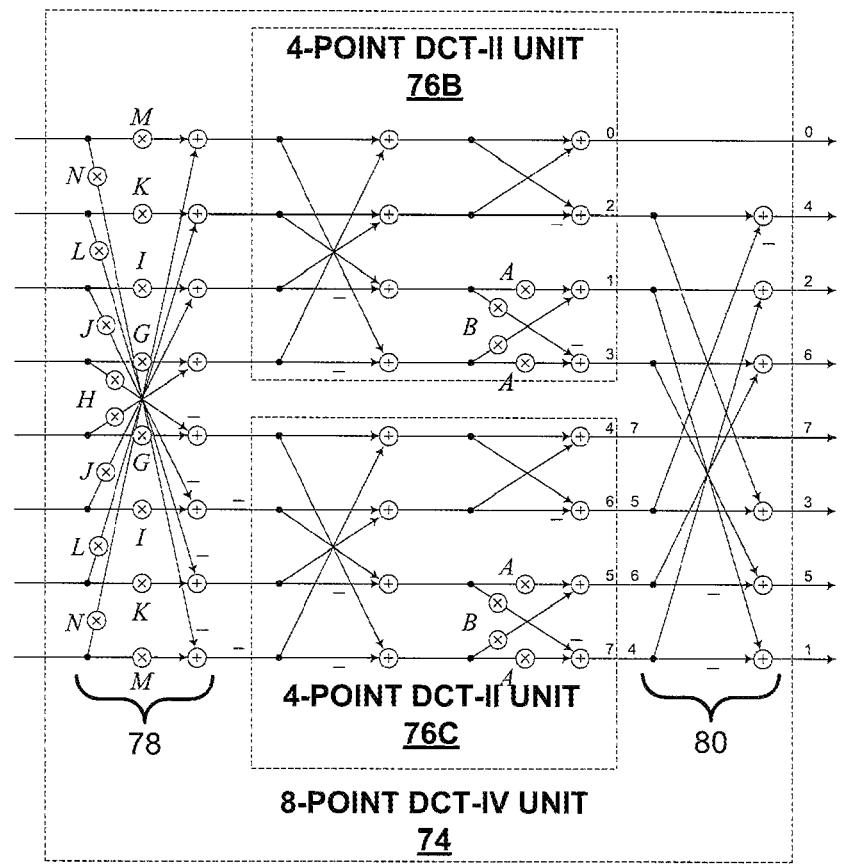

FIG. 4D is a block diagram illustrating 8-point DCT-IV unit 74 in more detail. In the example of FIG. 4D, 8-point DCT-IV unit 74 includes, as noted above, two 4-point DCT-II units 76B, 76C, each of which may be substantially similar to 4-point DCT-II unit 76 described above with respect to the example of FIG. 4B. 8-point DCT-IV unit 74, again as noted above, also includes factor multiplication unit 78 and cross-additive unit 80. Factor multiplication unit 78 multiplies the inputs to 8-point DCT-IV unit 74 by factors H, I, J, K, L, M, and N, and once multiplied by the factors, cross-adds the upper four inputs with the lower four inputs and cross-subtracts the upper four inputs from the lower four inputs. The upper four inputs then are processed by 4-point DCT-II unit 76B, while the lower four inputs are processed by 4-point DCT-II unit 76C. Cross-additive unit 80 then cross adds/subtracts (where subtraction is consider another form of addition) the lower seven inputs.

Generally, each of the above described DCT-II or DCT-IV units 72, 74 and 76A-76C may be represented as a matrix of the above noted factors A-N. For example, each of DCT-II units 76A-76C ("DCT-II units 76") may be represented by the matrix set forth in the following Table 1.

TABLE 1

| 4 × 4 DCT-II Matrix | | | |
|---|---|---|---|
| 1 | 1 | 1 | 1 |
| B | A | −A | −B |
| 1 | −1 | −1 | 1 |
| A | −B | B | −A |

DCT-II unit 72 may be represented by the matrix set forth in the following Table 2.

TABLE 2

| 8 × 8 DCT-II Matrix | | | | | | | |
|---|---|---|---|---|---|---|---|
| 1 | 1 | 1 | 1 | 1 | 1 | 1 | 1 |
| E + F | D + C | C − D | −F + E | F − E | −C + D | −D − C | −E − F |
| B | A | −A | −B | −B | −A | A | B |
| E | −D | −C | −F | F | C | D | −E |
| 1 | −1 | −1 | 1 | 1 | −1 | −1 | 1 |
| F | −C | D | E | −E | −D | C | −F |
| A | −B | B | −A | −A | B | −B | A |
| −F + E | −C + D | D + C | −E − F | E + F | −D − C | C − D | F − E |

DCT-IV unit 74 may be represented by the matrix set forth in the following Table 3.

TABLE 3

8 × 8 DCT-IV Matrix

| M | K | I | G | H | J | L | N |
|---|---|---|---|---|---|---|---|
| B*M + A*N | A*K + B*L | −A*I + B*J | −B*G + A*H | −B*H − A*G | −A*J − B*I | A*L − B*K | B*N − A*M |
| B*M − A*N | A*K − B*L | −A*I − B*J | −B*G − A*H | −B*H + A*G | −A*J + B*I | A*L + B*K | B*N + A*M |
| M + N | −K + L | −I − J | G − H | H + G | −J + I | −L − K | N − M |
| M − N | −L − K | −I + J | H + G | H − G | −I − J | −L + K | M + N |
| B*N + A*M | −B*K − A*L | −A*J + B*I | −A*G + B*H | −B*G − A*H | B*J + A*I | A*K − B*L | A*N − B*M |
| A*M − B*N | A*L − B*K | B*I + A*J | −B*H − A*G | −A*H + B*G | −A*I + B*J | −B*L − A*K | B*M + A*N |
| N | −L | J | −H | G | −I | K | −M |

Based on the above tables representative of the 4×4 DCT-II matrix, 8×8 DCT-II matrix and 8×8 DCT-IV matrix, the matrix for 16-point DCT-II unit 52 can be determined with the resulting matrix set forth in the following Table 4.

TABLE 4

16 × 16 DCT-II Matrix

| 1 | 1 | 1 | 1 | 1 | 1 | 1 | 1 | 1 |
|---|---|---|---|---|---|---|---|---|
| M | K | I | G | H | J | L | N | −N |
| E + F | D + C | C − D | −F + E | F − E | −C + D | −D − C | −E − F | −E − F |
| B*M + A*N | A*K + B*L | −A*I + B*J | −B*G + A*H | −B*H − A*G | −A*J − B*I | A*L − B*K | B*N − A*M | −B*N + A*M |
| B | A | −A | −B | −B | −A | A | B | B |
| B*M − A*N | A*K − B*L | −A*I − B*J | −B*G − A*H | −B*H + A*G | −A*J + B*I | A*L + B*K | B*N + A*M | −B*N − A*M |
| E | −D | −C | −F | F | C | D | −E | −E |
| M + N | −K + L | −I − J | G − H | H + G | −J + I | −L − K | N − M | −N + M |
| 1 | −1 | −1 | 1 | 1 | −1 | −1 | 1 | 1 |
| −N + M | −L − K | J − I | H + G | −G + H | −I − J | K − L | M + N | −M − N |
| F | −C | D | E | −E | −D | C | −F | −F |
| B*N + A*M | −A*L − B*K | −A*J + B*I | B*H − A*G | −B*G − A*H | A*I + B*J | A*K − B*L | −B*M + A*N | B*M − A*N |
| A | −B | B | −A | −A | B | −B | A | A |
| −B*N + A*M | A*L − B*K | A*J + B*I | −B*H − A*G | B*G − A*H | −A*I + B*J | −A*K − B*L | B*M + A*N | −B*M − A*N |
| −F + E | −C + D | D + C | −E − F | E + F | −D − C | C − D | F − E | F − E |
| N | −L | J | −H | G | −I | K | −M | M |

| | 1 | 1 | 1 | 1 | 1 | 1 | 1 |
|---|---|---|---|---|---|---|---|
| | −L | −J | −H | −G | −I | −K | −M |
| | −D − C | −C + D | F − E | −F + E | C − D | D + C | E + F |
| | −A*L + B*K | A*J + B*I | B*H + A*G | B*G − A*H | A*I − B*J | −A*K − B*L | −B*M − A*N |
| | A | −A | −B | −B | −A | A | B |
| | −A*L − B*K | A*J − B*I | B*H − A*G | B*G + A*H | A*I + B*J | −A*K + B*L | −B*M + A*N |
| | D | C | F | −F | −C | −D | E |
| | L + K | J − I | −H − G | −G + H | I + J | K − L | −M − N |
| | −1 | −1 | 1 | 1 | −1 | −1 | 1 |
| | −K + L | I + J | G − H | −H − G | −J + I | L + K | N − M |
| | C | −D | −E | E | D | −C | F |
| | −A*K + B*L | −A*I − B*J | B*G + A*H | −B*H + A*G | A*J − B*I | A*L + B*K | −B*N − A*M |
| | −B | B | −A | −A | B | −B | A |
| | A*K + B*L | A*I − B*J | −B*G + A*H | B*H + A*G | −A*J − B*I | −A*L + B*K | B*N − A*M |
| | C − D | −D − C | E + F | −E − F | D + C | −C − D | −F + E |
| | −K | I | −G | H | −J | L | −N |

Referring back to FIG. 4A, a number of external factors are shown being multiplied to outputs $X_0$-$X_{15}$, some of which involve normalization factors $\xi$, $\zeta$, $\eta$. These external factors may not be included within 16-point DCT-II unit 52 but may instead be removed and incorporated into quantization unit 40. Generally, these external factors are represented by the following diagonal matrix S, which again is incorporated into quantization unit 40.

$$S = \text{diag}\left(\frac{1}{4}, \frac{1}{2\sqrt{2}\,\eta}, \frac{1}{4\zeta}, \frac{1}{2\sqrt{2}\,\xi\eta}, \frac{1}{2\sqrt{2}\,\xi}, \frac{1}{2\sqrt{2}\,\xi\eta}, \frac{1}{2\sqrt{2}\,\zeta}, \right.$$
$$\left. \frac{1}{4\eta}, \frac{1}{4}, \frac{1}{4\eta}, \frac{1}{2\sqrt{2}\,\zeta}, \frac{1}{2\sqrt{2}\,\xi\eta}, \frac{1}{2\sqrt{2}\,\xi}, \frac{1}{2\sqrt{2}\,\xi\eta}, \frac{1}{4\zeta}, \frac{1}{2\sqrt{2}\,\eta}\right);$$

where these normalization factors may improve implementation complexity by reducing large values for internal factors that require many operations to apply to inputs. If these external factors are removed, 16-point DCT-II unit 52 is referred to as a scaled 16-point DCT-II unit 52 considering that 16-point DCT-II unit 52 outputs scaled outputs that require application of diagonal matrix S to properly generate full, non-scaled outputs that accurately represent DCT coefficients. If 16-point DCT-II unit 52 retains these external factors, 16-point DCT-II unit 52 is referred to as a full 16-point DCT-II unit 52. Depending on the context, either a full or scaled unit may be employed for 16-point DCT-II unit 52, and the techniques of this disclosure should not be limited to any type of full or scaled implementation.

In any event, below are some exemplary implementation specific values that may be selected for the above internal and normalization factors to generate a 16-point DCT-II unit 52 that provides various benefits. As a general note, the values that follow for the factors are selected such that the resulting data, various coding standards, such as the H.264 video coding standard, adopted an orthogonal implementation of the 8-point DCT.

A survey of various values for internal factors A-N provides some indication as to the tradeoffs involved in selecting these values. Beginning with 4-point DCT-II units 76 and internal factors A and B, an analysis of values for these factors is set forth in the following Table 5.

TABLE 5

| Parameters | | | Approximation errors | | |
|---|---|---|---|---|---|
| A | B | $\xi$ | $\cos\left(\frac{3\pi}{8}\right) - A/\xi$ | $\sin\left(\frac{3\pi}{8}\right) - B/\xi$ | Bits used |
| 1 | 2 | $\sqrt{5}$ | −0.0645302 | 0.0294523 | 1 |
| 2 | 5 | $\sqrt{29}$ | 0.0112928 | −0.00459716 | 2 |
| 3 | 7 | $\sqrt{58}$ | −0.0112359 | 0.0047345 | 3 |
| 5 | 12 | 13 | −0.00193195 | 0.000802609 | 4 |
| 17 | 41 | $\sqrt{1970}$ | −0.00033159 | 0.000137419 | 5 |

With reference to Table 5, values for internal factors A and B are shown with respect to approximation errors and number of bits required to store factors A and B. Generally, as the values for internal factors A and B increase in size, the approximation error decreases and the number of bits required to store these larger values increases.

Continuing the survey with respect to 8-point DCT-II unit 72 and internal factors C, D, E, and F, an analysis of values for these factors is set forth in the following Table 6.

TABLE 6

| Parameters | | | | | Approximation errors | | | | |
|---|---|---|---|---|---|---|---|---|---|
| C | D | E | F | $\zeta$ | $\cos\left(\frac{\pi}{16}\right) - \frac{C}{\zeta}$ | $\sin\left(\frac{\pi}{16}\right) - \frac{D}{\zeta}$ | $\cos\left(\frac{3\pi}{16}\right) - \frac{E}{\zeta}$ | $\sin\left(\frac{3\pi}{16}\right) - \frac{Z}{\zeta}$ | Bits used |
| 1 | 1 | 1 | 1 | 1.41421 | 0.273678 | −0.512016 | 0.124363 | −0.151537 | 1 |
| 3 | 1 | 3 | 1 | 3.16228 | 0.032102 | −0.121137 | −0.117214 | 0.239342 | 2 |
| 5 | 2 | 5 | 2 | 5.38516 | 0.052308 | −0.1763 | −0.097007 | 0.18418 | 3 |
| 11 | 3 | 9 | 7 | 11.4018 | 0.016021 | −0.068027 | 0.042117 | −0.058370 | 4 |
| 19 | 4 | 16 | 11 | 19.4165 | 0.002235 | −0.010920 | 0.007427 | −0.010958 | 5 |
| 38 | 8 | 32 | 22 | 38.833 | 0.002235 | −0.010920 | 0.007427 | −0.010958 | 6 |
| 65 | 13 | 55 | 37 | 66.2873 | 0.000204 | −0.001025 | 0.001747 | −0.002606 | 7 |
| 111 | 22 | 94 | 63 | 113.159 | −0.00013 | 0.0006739 | 0.000781 | −0.001167 | 8 |

DCT matrixes retain an orthogonality property, which is defined by the following equation (1).

$$C^T C = I, \qquad (1)$$

where C represents the full non-scaled transform matrix and $C^T$ represents the transpose of matrix C. Generally, orthogonality is desired with respect to DCT-II implementations because it is invertible. This invertible property, as one example, allows a video encoder to apply the orthogonal 16-point DCT implementation to generate DCT coefficients from residual blocks of video data. A video decoder can then apply the 8-point inverse DCT-II (IDCT) implementation to reconstruct the residual block of video data from the DCT-II coefficients with little if any loss in data. Considering that one of the main goals of video encoding is the preservation of Similar to the analysis set forth in Table 5 above, as the values for internal factors C-F increase in size, the approximation error decreases and the number of bits required to store these larger values increases.

The analysis for internal factors H-N of 8-point DCT-IV unit 74 is set forth in the following Table 7.

TABLE 7

| Parameters | | | | | | | | | Max. Error | Bits used |
|---|---|---|---|---|---|---|---|---|---|---|
| N | L | J | H | G | I | K | M | $\eta$ | | |
| 1 | 1 | 1 | 1 | 1 | 1 | 1 | 1 | 1.41421 | 0.60909 | 1 |
| 1 | 1 | 1 | 1 | 3 | 3 | 3 | 3 | 3.16228 | 0.318166 | 2 |

TABLE 7-continued

| Parameters | | | | | | | | Max. | Bits |
|---|---|---|---|---|---|---|---|---|---|
| N | L | J | H | G | I | K | M | η | Error | used |
| 2 | 2 | 2 | 2 | 5 | 5 | 5 | 5 | 5.38516 | 0.273374 | 3 |
| 3 | 3 | 7 | 7 | 9 | 9 | 11 | 11 | 11.4018 | 0.1651 | 4 |
| 1 | 6 | 10 | 10 | 15 | 15 | 17 | 18 | 18.0278 | 0.0833035 | 5 |
| 6 | 11 | 21 | 27 | 34 | 38 | 42 | 43 | 43.4166 | 0.0401789 | 6 |
| 7 | 17 | 31 | 37 | 49 | 53 | 59 | 61 | 61.4003 | 0.0334866 | 7 |

Similar to the analysis set forth in Tables 5 and 6 above, as the values for internal factors H-N increase in size, the maximum approximation error decreases and the number of bits required to store these larger values increases. With respect to the analysis set forth in Table 7, the maximum approximation error is so large with respect to the first 4 or 5 combinations of internal factors that the choice of values for internal factors H-N is between 5-, 6- and 7-bit approximations.

With the above survey analysis complete, a number of different implementations or designs may result through various selection of values for internal factors A-N from the above Tables 5-7. A first design or implementation may be configured that is least precise in terms of approximation error when compared to the following two designs by selecting values of 1 and 2 for internal factors A and B, respectively. This first design is also configured by selecting the 5-bit approximation from Table 7 above, wherein internal factors N, L, J, H, G, I, K, M are set to values 1, 6, 10, 10, 15, 15, 17, 18, respectively. The first design is further configured with values of 11, 3, 9 and 7 for internal factors C, D, E, F, respectively.

The first design or implementation may be summarized by the matrix set forth in the following Table 8.

TABLE 8

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 18 | 17 | 15 | 15 | 10 | 10 | 6 | 1 | −1 | −6 | −10 | −10 | −15 | −15 | −17 | −18 |
| 16 | 14 | 8 | 2 | −2 | −8 | −14 | −16 | −16 | −14 | −8 | −2 | 2 | 8 | 14 | 16 |
| 37 | 29 | 5 | −20 | −35 | −40 | −28 | −16 | 16 | 28 | 40 | 35 | 20 | −5 | −29 | −37 |
| 2 | 1 | −1 | −2 | −2 | −1 | 1 | 2 | 2 | 1 | −1 | −2 | −2 | −1 | 1 | 2 |
| 35 | 5 | −35 | −40 | −5 | 20 | 40 | 20 | −20 | −40 | −20 | 5 | 40 | 35 | −5 | −35 |
| 9 | −3 | −11 | −7 | 7 | 11 | 3 | −9 | −9 | 3 | 11 | 7 | −7 | −11 | −3 | 9 |
| 19 | −11 | −25 | 5 | 25 | 5 | −23 | −17 | 17 | 23 | −5 | −25 | −5 | 25 | 11 | −19 |
| 1 | −1 | −1 | 1 | 1 | −1 | −1 | 1 | 1 | −1 | −1 | 1 | 1 | −1 | −1 | 1 |
| 17 | −23 | −5 | 25 | −5 | −25 | 11 | 19 | −19 | −11 | 25 | 5 | −25 | 5 | 23 | −17 |
| 7 | −11 | 3 | 9 | −9 | −3 | 11 | −7 | −7 | 11 | −3 | −9 | 9 | 3 | −11 | 7 |
| 20 | −40 | 20 | 5 | −40 | 35 | 5 | −35 | 35 | −5 | −35 | 40 | −5 | −20 | 40 | −20 |
| 1 | −2 | 2 | −1 | −1 | 2 | −2 | 1 | 1 | −2 | 2 | −1 | −1 | 2 | −2 | 1 |
| 16 | −28 | 40 | −35 | 20 | 5 | −29 | 37 | −37 | 29 | −5 | −20 | 35 | −40 | 28 | −16 |
| 2 | −8 | 14 | −16 | 16 | −14 | 8 | −2 | −2 | 8 | −14 | 16 | −16 | 14 | −8 | 2 |
| 1 | −6 | 10 | −10 | 15 | −15 | 17 | −18 | 18 | −17 | 15 | −15 | 10 | −10 | 6 | −1 |

A number of matrix coefficients shown in the above Table 8 are large values that may increase implementation complexity in terms of operations required to perform multiplications by these large values. To remove these large values and balance dynamic range across the transform, right shifts can be introduced into the implementation of the first design after multiplications, resulting in the following normalized internal factors set forth in Table 9. It should be noted that the right shifts can be by an arbitrary positive integer. The only restriction is that the right shifts for parameters A and B are the same. Similarly right shifts for C, D, E, and F are the same. Finally right shifts for parameters for N, L, J, H, G, I, K, and M are the same. The right shifts convert these integer parameters into dyadic rationals. A dyadic rational is a rational number where the denominator is a power of 2. The right shifts may decrease the accuracy of the transform. So it is desirable to keep them to a minimum.

TABLE 9

| A | B | C | D | E | F | N | L | J | H | G | I | K | M |
|---|---|---|---|---|---|---|---|---|---|---|---|---|---|
| 1/2 | 2/2 | 11/16 | 3/16 | 9/16 | 7/16 | 1/16 | 6/16 | 10/16 | 10/16 | 15/16 | 15/16 | 17/16 | 18/16 |

Using these normalized internal factors, the matrix set forth in Table 8 is reduced to the matrix set forth in the following Table 10.

TABLE 10

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 9/8 | 17/16 | 15/16 | 15/16 | 5/8 | 5/8 | 3/8 | 1/16 | −1/16 | −3/8 | −5/8 | −5/8 | −15/16 | −15/16 | −17/16 | −9/8 |
| 1 | 7/8 | 1/2 | 1/8 | −1/8 | −1/2 | −7/8 | −1 | −1 | −7/8 | −1/2 | −1/8 | 1/8 | 1/2 | 7/8 | 1 |
| 37/32 | 29/32 | 5/32 | −5/8 | −35/32 | −5/4 | −7/8 | −1/2 | 1/2 | 7/8 | 5/4 | 35/32 | 5/8 | −5/32 | −29/32 | −37/32 |
| 1 | 1/2 | −1/2 | −1 | −1 | −1/2 | 1/2 | 1 | 1 | 1/2 | −1/2 | −1 | −1 | −1/2 | 1/2 | 1 |
| 35/32 | 5/32 | −35/32 | −5/4 | −5/32 | 5/8 | 5/4 | 5/8 | −5/8 | −5/4 | −5/8 | 5/32 | 5/4 | 35/32 | −5/32 | −35/32 |
| 9/16 | −3/16 | −11/16 | −7/16 | 7/16 | 11/16 | 3/16 | −9/16 | −9/16 | 3/16 | 11/16 | 7/16 | −7/16 | −11/16 | −3/16 | 9/16 |
| 19/16 | −11/16 | −25/16 | 5/16 | 25/16 | 5/16 | −23/16 | −17/16 | 17/16 | 23/16 | −5/16 | −25/16 | −5/16 | 25/16 | 11/16 | −19/16 |
| 1 | −1 | −1 | 1 | 1 | −1 | −1 | 1 | 1 | −1 | −1 | 1 | 1 | −1 | −1 | 1 |
| 17/16 | −23/16 | −5/16 | 25/16 | −5/16 | −25/16 | 11/16 | 19/16 | −19/16 | −11/16 | 25/16 | 5/16 | −25/16 | 5/16 | 23/16 | −17/16 |
| 7/16 | −11/16 | 3/16 | 9/16 | −9/16 | −3/16 | 11/16 | −7/16 | −7/16 | 11/16 | −3/16 | −9/16 | 9/16 | 3/16 | −11/16 | 7/16 |
| 5/8 | −5/4 | 5/8 | 5/32 | −5/4 | 35/32 | 5/32 | −35/32 | 35/32 | −5/32 | −35/32 | 5/4 | −5/32 | −5/8 | 5/4 | −5/8 |
| 1/2 | −1 | 1 | −1/2 | −1/2 | 1 | −1 | 1/2 | 1/2 | −1 | 1 | −1/2 | −1/2 | 1 | −1 | 1/2 |
| 1/2 | −7/8 | 5/4 | −35/32 | 5/8 | 5/32 | −29/32 | 37/32 | −37/32 | 29/32 | −5/32 | −5/8 | 35/32 | −5/4 | 7/8 | −1/2 |
| 1/8 | −1/2 | 7/8 | −1 | 1 | −7/8 | 1/2 | −1/8 | −1/8 | 1/2 | −7/8 | 1 | −1 | 7/8 | −1/2 | 1/8 |
| 1/16 | −3/8 | 5/8 | −5/8 | 15/16 | −15/16 | 17/16 | −9/8 | 9/8 | −17/16 | 15/16 | −15/16 | 5/8 | −5/8 | 3/8 | −1/16 |

The range of matrix coefficients in Table 10 is between −1.56 and 1.56, which is generally tight enough or suitable for DCT implementations. The first design has a diagonal matrix S with the following values:

$$\left[\frac{1}{4}, \frac{4\sqrt{130}}{65}, \frac{2\sqrt{130}}{65}, \frac{8\sqrt{130}}{325}, \frac{\sqrt{10}}{10}, \frac{8\sqrt{130}}{325}, \frac{4\sqrt{65}}{65}, \frac{4\sqrt{13}}{65}, \frac{1}{4}, \frac{4\sqrt{13}}{65}, \frac{4\sqrt{65}}{65}, \frac{8\sqrt{130}}{325}, \frac{\sqrt{10}}{10}, \frac{8\sqrt{130}}{325}, \frac{2\sqrt{130}}{65}, \frac{4\sqrt{26}}{65}\right]$$

which after multiplication by four and conversion to floating point are approximately equal to the following values:

[1., 1.255143265, 1.403292831, 1.122634265, 1.264911064, 1.122634265, 1.984555754, 0.8875203140, 1., 0.8875203140, 1.984555754, 1.122634265, 1.264911064, 1.122634265, 1.403292831, 1.255143265].

The second design is more precise than the first but not as precise as the third design described below in more detail. The second design is configured with the values 6, 11, 21, 27, 34, 38, 42 and 43 for internal factors N, L, J, H, G, I, K, M, respectively, where these values result in a 6-bit approximation. Leaving all of the remaining internal factors the same as those specified above for the first design, the 16-point DCT coefficient matrix becomes that set forth in the following Table 11.

TABLE 11

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 43 | 42 | 38 | 34 | 27 | 21 | 11 | 6 | −6 | −11 | −21 | −27 | −34 | −38 | −42 | −43 |
| 16 | 14 | 8 | 2 | −2 | −8 | −14 | −16 | −16 | −14 | −8 | −2 | 2 | 8 | 14 | 16 |
| 92 | 64 | 4 | −41 | −88 | −97 | −73 | −31 | 31 | 73 | 97 | 88 | 41 | −4 | −64 | −92 |
| 2 | 1 | −1 | −2 | −2 | −1 | 1 | 2 | 2 | 1 | −1 | −2 | −2 | −1 | 1 | 2 |
| 80 | 20 | −80 | −95 | −20 | 55 | 95 | 55 | −55 | −95 | −55 | 20 | 95 | 80 | −20 | −80 |
| 9 | −3 | −11 | −7 | 7 | 11 | 3 | −9 | −9 | 3 | 11 | 7 | −7 | −11 | −3 | 9 |
| 49 | −31 | −59 | 7 | 61 | 17 | −53 | −37 | 37 | 53 | −17 | −61 | −7 | 59 | 31 | −49 |
| 1 | −1 | −1 | 1 | 1 | −1 | −1 | 1 | 1 | −1 | −1 | 1 | 1 | −1 | −1 | 1 |
| 37 | −53 | −17 | 61 | −7 | −59 | 31 | 49 | −49 | −31 | 59 | 7 | −61 | 17 | 53 | −37 |
| 7 | −11 | 3 | 9 | −9 | −3 | 11 | −7 | −7 | 11 | −3 | −9 | 9 | 3 | −11 | 7 |
| 55 | −95 | 55 | 20 | −95 | 80 | 20 | −80 | 80 | −20 | −80 | 95 | 20 | −55 | 95 | −55 |
| 1 | −2 | 2 | −1 | −1 | 2 | −2 | 1 | 1 | −2 | 2 | −1 | −1 | 2 | −2 | 1 |
| 31 | −73 | 97 | −88 | 41 | 4 | −64 | 92 | −92 | 64 | −4 | −41 | 88 | −97 | 73 | −31 |
| 2 | −8 | 14 | −16 | 16 | −14 | 8 | −2 | −2 | 8 | −14 | 16 | −16 | 14 | −8 | 2 |
| 6 | −11 | 21 | −27 | 34 | −38 | 42 | −43 | 43 | −42 | 38 | −34 | 27 | −21 | 11 | −6 |

After the introduction of the above noted right shifts, the factors A-N become that set forth in the following Table 12.

TABLE 12

| A | B | C | D | E | F | N | L | J | H | G | I | K | M |
|---|---|---|---|---|---|---|---|---|---|---|---|---|---|
| 1/2 | 2/2 | 11/16 | 3/16 | 9/16 | 7/16 | 6/64 | 11/64 | 21/64 | 27/64 | 34/64 | 38/64 | 42/64 | 43/64 |

The matrix specified in Table 11 become that set forth in the following Table 13, when these shifts are introduced.

TABLE 13

| 1 | 1 | 1 | 1 | 1 | 1 | 1 | 1 |
|---|---|---|---|---|---|---|---|
| 21/32 | 19/32 | 17/32 | 27/64 | 21/64 | 11/64 | 3/32 | −3/32 |
| 7/8 | 1/2 | 1/8 | −1/8 | −1/2 | −7/8 | −1 | −1 |
| 1/2 | 1/32 | 41/128 | −11/16 | −97/128 | −73/128 | −31/128 | 31/128 |
| 1/2 | −1/2 | −1 | −1 | −1/2 | 1/2 | 1 | 1 |
| 5/32 | −5/8 | −95/128 | −5/32 | 55/128 | 95/128 | 55/128 | −55/128 |
| −3/16 | −11/16 | −7/16 | 7/16 | 11/16 | 3/16 | −9/16 | −9/16 |
| −31/64 | −59/64 | 7/64 | 61/64 | 17/64 | −53/64 | −37/64 | 37/64 |
| −1 | −1 | 1 | 1 | −1 | −1 | 1 | 1 |
| −53/64 | −17/64 | 61/64 | −7/64 | −59/64 | 31/64 | 49/64 | −49/64 |
| −11/16 | 3/16 | 9/16 | −9/16 | −3/16 | 11/16 | −7/16 | −7/16 |
| −95/128 | 55/128 | 5/32 | −95/128 | 5/8 | 5/32 | −5/8 | 5/8 |
| −1 | 1 | −1/2 | −1/2 | 1 | −1 | 1/2 | 1/2 |
| −73/128 | 97/128 | −11/16 | 41/128 | 1/32 | −1/2 | 23/32 | −23/32 |
| −1/2 | 7/8 | −1 | 1 | −7/8 | 1/2 | −1/8 | −1/8 |
| −11/64 | 21/64 | −27/64 | 17/32 | −19/32 | 21/32 | −43/64 | 43/64 |

| 1 | 1 | 1 | 1 | 1 | 1 | 1 |
|---|---|---|---|---|---|---|
| −11/64 | −21/64 | −27/64 | −17/32 | −19/32 | −21/32 | −43/64 |
| −7/8 | −1/2 | −1/8 | 1/8 | 1/2 | 7/8 | 1 |
| 73/128 | 97/128 | 11/16 | 41/128 | −1/32 | −1/2 | −23/32 |
| 1/2 | −1/2 | −1 | −1 | −1/2 | 1/2 | 1 |
| −95/128 | −55/128 | 5/32 | 95/128 | 5/8 | −5/32 | −5/8 |
| 3/16 | 11/16 | 7/16 | −7/16 | −11/16 | −3/16 | 9/16 |
| 53/64 | −17/64 | −61/64 | −7/64 | 59/64 | 31/64 | −49/64 |
| −1 | −1 | 1 | 1 | −1 | −1 | 1 |
| −31/64 | 59/64 | 7/64 | −61/64 | 17/64 | 53/64 | −37/64 |
| 11/16 | −3/16 | −9/16 | 9/16 | 3/16 | −11/16 | 7/16 |
| −5/32 | −5/8 | 95/128 | −5/32 | −55/128 | 95/128 | −55/128 |
| −1 | 1 | −1/2 | −1/2 | 1 | −1 | 1/2 |
| 1/2 | −1/32 | −41/128 | 11/16 | 97/128 | 73/128 | −31/128 |
| 1/2 | −7/8 | 1 | −1 | 7/8 | −1/2 | 1/8 |
| −21/32 | 19/32 | −17/32 | 27/64 | −21/64 | 11/64 | −3/32 |

Referring to Table 13, all of the factors are in a [−1 ... 1] range. The values of the diagonal matrix of scale factors S become the following values:

$$\left[\frac{1}{4}, \frac{16\sqrt{3770}}{1885}, \frac{2\sqrt{130}}{65}, \frac{32\sqrt{754}}{1885}, \frac{\sqrt{10}}{10}, \right.$$
$$\frac{32\sqrt{754}}{1885}, \frac{4\sqrt{65}}{65}, \frac{16\sqrt{1885}}{1885}, \frac{1}{4}, \frac{16\sqrt{1885}}{1885}, \frac{4\sqrt{65}}{65},$$
$$\left. \frac{32\sqrt{754}}{1885}, \frac{\sqrt{10}}{10}, \frac{32\sqrt{754}}{1885}, \frac{2\sqrt{130}}{65}, \frac{16\sqrt{3770}}{1885} \right]$$

which after multiplication by four and conversion to floating point values are approximately equal to the following values: [1., 2.084679494, 1.403292831, 1.864594024, 1.264911064, 1.864594024, 1.984555754, 1.474091007, 1., 1.474091007, 1.984555754, 1.864594024, 1.264911064, 1.864594024, 1.403292831, 2.084679494].

The third design includes the same values for internal factors N, L, J, H, G, I, K, M, as those configured for the second design, i.e., the 6-bit approximation values in this example. Instead of changing these values, the third design includes values of 2 and 5 for internal factors A and B and values 19, 4, 16 and 11 for internal factors C-F. With these values set for the internal factors, the transform matrix set forth in the following Table 14 is produced.

TABLE 14

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 43 | 42 | 38 | 34 | 27 | 21 | 11 | 6 | −6 | −11 | −21 | −27 | −34 | −38 | −42 | −43 |
| 27 | 23 | 15 | 5 | −5 | −15 | −23 | −27 | −27 | −23 | −15 | −5 | 5 | 15 | 23 | 27 |
| 227 | 139 | 29 | −116 | −203 | −232 | −188 | −56 | 56 | 188 | 232 | 203 | 116 | −29 | −139 | −227 |
| 5 | 2 | −2 | −5 | −5 | −2 | 2 | 5 | 5 | 2 | −2 | −5 | −5 | −2 | 2 | 5 |
| 203 | 29 | −181 | −224 | −67 | 148 | 232 | 116 | −116 | −232 | −148 | 67 | 224 | 181 | −29 | −203 |
| 16 | −4 | −19 | −11 | 11 | 19 | 4 | −16 | −16 | 4 | 19 | 11 | −11 | −19 | −4 | 16 |
| 49 | −31 | −59 | 7 | 61 | 17 | −53 | −37 | 37 | 53 | −17 | −61 | −7 | 59 | 31 | −49 |
| 1 | −1 | −1 | 1 | 1 | −1 | −1 | 1 | 1 | −1 | −1 | 1 | 1 | −1 | −1 | 1 |
| 37 | −53 | −17 | 61 | −7 | −59 | 31 | 49 | −49 | −31 | 59 | 7 | −61 | 17 | 53 | −37 |
| 11 | −19 | 4 | 16 | −16 | −4 | 19 | −11 | −11 | 19 | −4 | −16 | 16 | 4 | −19 | 11 |
| 116 | −232 | 148 | 67 | −224 | 181 | 29 | −203 | 203 | −29 | −181 | 224 | −67 | −148 | 232 | −116 |
| 2 | −5 | 5 | −2 | −2 | 5 | −5 | 2 | 2 | −5 | 5 | −2 | −2 | 5 | −5 | 2 |
| 56 | −188 | 232 | −203 | 116 | 29 | −139 | 227 | −227 | 139 | −29 | −116 | 203 | −232 | 188 | −56 |
| 5 | −15 | 23 | −27 | 27 | −23 | 15 | −5 | −5 | 15 | −23 | 27 | −27 | 23 | −15 | 5 |
| 6 | −11 | 21 | −27 | 34 | −38 | 42 | −43 | 43 | −42 | 38 | −34 | 27 | −21 | 11 | −6 |

After the introduction of the above noted right shifts, the factors A-N become that set forth in the following Table 15.

TABLE 15

| A | B | C | D | E | F | N | L | J | H | G | I | K | M |
|---|---|---|---|---|---|---|---|---|---|---|---|---|---|
| 2/4 | 5/4 | 19/32 | 4/32 | 16/32 | 11/32 | 6/64 | 11/64 | 21/64 | 27/64 | 34/64 | 38/64 | 42/64 | 43/64 |

The matrix specified in Table 14 become that set forth in the following Table 16, when these shifts are introduced.

TABLE 16

| 1 | 1 | 1 | 1 | 1 | 1 | 1 | 1 |
|---|---|---|---|---|---|---|---|
| 43/64 | 21/32 | 19/32 | 17/32 | 27/64 | 21/64 | 11/64 | 3/32 |
| 27/32 | 23/32 | 15/32 | 5/32 | −5/32 | −15/32 | −23/32 | −27/32 |
| 227/256 | 139/256 | 29/256 | −29/64 | −203/256 | −29/32 | −47/64 | −7/32 |
| 5/4 | 1/2 | −1/2 | −5/4 | −5/4 | −1/2 | 1/2 | 5/4 |
| 203/256 | 29/256 | −181/256 | −7/8 | −67/256 | 37/64 | 29/32 | 29/64 |
| 1/2 | −1/8 | −19/32 | −11/32 | 11/32 | 19/32 | 1/8 | −1/2 |
| 49/64 | −31/64 | −59/64 | 7/64 | 61/64 | 17/64 | −53/64 | −37/64 |
| 1 | −1 | −1 | 1 | 1 | −1 | −1 | 1 |
| 37/64 | −53/64 | −17/64 | 61/64 | −7/64 | −59/64 | 31/64 | 49/64 |
| 11/32 | −19/32 | 1/8 | 1/2 | −1/2 | −1/8 | 19/32 | −11/32 |
| 29/64 | −29/32 | 37/64 | 67/256 | −7/8 | 181/256 | 29/256 | −203/256 |
| 1/2 | −5/4 | 5/4 | −1/2 | −1/2 | 5/4 | −5/4 | 1/2 |
| 7/32 | −47/64 | 29/32 | −203/256 | 29/64 | 29/256 | −139/256 | 227/256 |
| 5/32 | −15/32 | 23/32 | −27/32 | 27/32 | −23/32 | 15/32 | −5/32 |
| 3/32 | −11/64 | 21/64 | −27/64 | 17/32 | −19/32 | 21/64 | −43/64 |
| 1 | 1 | 1 | 1 | 1 | 1 | 1 | 1 |
| −3/32 | −11/64 | −21/64 | −27/64 | −17/32 | −19/32 | −21/32 | −43/64 |
| −27/32 | −23/32 | −15/32 | −5/32 | 5/32 | 15/32 | 23/32 | 27/32 |
| 7/32 | 47/64 | 29/32 | 203/256 | 29/64 | −29/256 | −139/256 | −227/256 |
| 5/4 | 1/2 | −1/2 | −5/4 | −5/4 | −1/2 | 1/2 | 5/4 |
| −29/64 | −29/32 | −37/64 | 67/256 | 7/8 | 181/256 | −29/256 | −203/256 |
| −1/2 | 1/8 | 19/32 | 11/32 | −11/32 | −19/32 | −1/8 | 1/2 |
| 37/64 | 53/64 | −17/64 | −61/64 | −7/64 | 59/64 | 31/64 | −49/64 |
| 1 | −1 | −1 | 1 | 1 | −1 | −1 | 1 |
| −49/64 | −31/64 | 59/64 | 7/64 | −61/64 | 17/64 | 53/64 | −37/64 |
| −11/32 | 19/32 | −1/8 | −1/2 | 1/2 | 1/8 | −19/32 | 11/32 |
| 203/256 | −29/256 | −181/256 | 7/8 | −67/256 | −37/64 | 29/32 | −29/64 |
| 1/2 | −5/4 | 5/4 | −1/2 | −1/2 | 5/4 | −5/4 | 1/2 |
| −227/256 | 139/256 | −29/256 | −29/64 | 203/256 | −29/32 | 47/64 | −7/32 |
| −5/32 | 15/32 | −23/32 | 27/32 | −27/32 | 23/32 | −15/32 | 5/32 |
| 43/64 | −21/32 | 19/32 | −17/32 | 27/32 | −21/64 | 11/64 | −3/32 |

Referring to Table 13, all of the factors are in a [−1.25 ... 1.25] range. The values of the diagonal matrix of scale factors S become the following values:

$$\begin{bmatrix} \frac{1}{4}, \frac{16\sqrt{3770}}{1885}, \frac{8\sqrt{377}}{377}, \frac{64\sqrt{130}}{1885}, \frac{\sqrt{58}}{29}, \\ \frac{64\sqrt{130}}{1885}, \frac{8\sqrt{754}}{377}, \frac{16\sqrt{1885}}{1885}, \frac{1}{4}, \frac{16\sqrt{1885}}{1885}, \frac{8\sqrt{754}}{377}, \\ \frac{64\sqrt{130}}{1885}, \frac{\sqrt{58}}{29}, \frac{64\sqrt{130}}{1885}, \frac{8\sqrt{377}}{377}, \frac{16\sqrt{3770}}{1885} \end{bmatrix}$$

which after multiplication by four and conversion to floating point values are approximately equal to the following values:

[1., 2.084679494, 1.648083848, 1.548461055, 1.050451463, 1.548461055, 2.330742531, 1.474091007, 1., 1.474091007, 2.330742531, 1.548461055, 1.050451463, 1.548461055, 1.648083848, 2.084679494].

In terms of implementation complexity, the underlying factorization that produces the implementation described above with respect to FIGS. 4A-4D requires approximately 72 additions and 36 multiplications by constant internal factors A-N. However, since internal factors A-N are integer (or dyadic rational numbers), these multiplications can be replaced with a series of additions and shift operations. The complexity of this multiplier-less implementation for the third design is set forth in the following Table 17.

TABLE 17

| Factors | | Algorithms: y = x * [A, C, E, G, I, K, M]; z = x * [B, D, F, H, J, L, N] | Complexity | Times used |
|---|---|---|---|---|
| A = 2/4 | B = 5/4 | y = x >> 1; z = x + (x >> 2); | 1 add + 2 shifts | 6 |
| C = 19/32 | D = 4/32 | z = x >> 3; y = (x >> 1) + z − (z >> 2); | 2 adds + 3 shifts | 2 |
| E = 16/32 | F = 11/32 | y = x >> 1; z = ((x + y) >> 2) − (y >> 4); | 2 adds + 3 shifts | 2 |
| G = 34/64 | H = 27/64 | x1 = x >> 5; z = x1 + (x >> 1); x2 = x1 + z; y = x2 − (x2 >> 2); | 3 adds + 3 shifts | 2 |
| I = 38/64 | J = 21/64 | x1 = x >> 4; x2 = x + x1; y = x1 + (x2 >> 1); z = y − (x2 >> 2); | 3 adds + 3 shifts | 2 |
| K = 42/64 | L = 11/64 | x1 = x − (x >> 3); y = x1 − (x1 >> 2); z = (x − y) >> 1; | 3 adds + 3 shifts | 2 |
| M = 43/64 | N = 6/64 | x1 = x − (x >> 2); z = x1 >> 3; x2 = x1 − z; y = x − (x2 >> 1); | 3 adds + 3 shifts | 2 |
| Total: | | | 38 adds + 48 shifts | |

Adding these 38 additions and 48 shifts in place of the 36 multiplications noted above results in a total implementation complexity of 110 additions and 48 shifts.

For the second design, the following Table 18 summarizes the complexity of the multiplier-less implementation.

TABLE 18

| Factors | | Algorithms: y = x * [A, C, E, G, I, K, M]; z = x * [B, D, F, H, J, L, N] | Complexity | Times used |
|---|---|---|---|---|
| A = 1/2 | B = 1 | y = x >> 1; z = x; | 1 shift | 6 |
| C = 11/16 | D = 3/16 | x1 = x >> 1; x2 = x + x1; z = x2 >> 3; y = x1 + z; | 2 adds + 2 shifts | 2 |
| E = 9/16 | F = 7/16 | x1 = x − (x >> 3); z = x1 >> 1; y = x − z; | 2 adds + 2 shifts | 2 |
| G = 34/64 | H = 27/64 | x1 = x >> 5; z = x1 + (x >> 1); x2 = x1 + z; y = x2 − (x2 >> 2); | 3 adds + 3 shifts | 2 |
| I = 38/64 | J = 21/64 | x1 = x >> 4; x2 = x + x1; y = x1 + (x2 >> 1); z = y − (x2 >> 2); | 3 adds + 3 shifts | 2 |
| K = 42/64 | L = 11/64 | x1 = x − (x >> 3); y = x1 − (x1 >> 2); z = (x − y) >> 1; | 3 adds + 3 shifts | 2 |
| M = 43/64 | N = 6/64 | x1 = x − (x >> 2); z = x1 >> 3; x2 = x1 − z; y = x − (x2 >> 1); | 3 adds + 3 shifts | 2 |
| Total: | | | 32 adds + 38 shifts | |

In this instance, the total complexity after replacing the 36 multiplications noted above with the 32 additions and 38 shifts results in an overall implementation complexity of 104 additions and 38 shifts.

For the first design, the following Table 19 summarizes the complexity of the multiplier-less implementation.

TABLE 19

| Factors | | Algorithms: y = x * [A, C, E, G, I, K, M]; z = x * [B, D, F, H, J, L, N] | Complexity | Times used |
|---|---|---|---|---|
| A = 1/2 | B = 1 | y = x >> 1; z = x; | 1 shift | 6 |
| C = 11/16 | D = 3/16 | x1 = x >> 1; x2 = x + x1; z = x2 >> 3; y = x1 + z; | 2 adds + 2 shifts | 2 |
| E = 9/16 | F = 7/16 | x1 = x − (x >> 3); z = x1 >> 1; y = x − z; | 2 adds + 2 shifts | 2 |
| G = 15/16 | H = 10/16 | x1 = x + (x >> 2); z = x1 >> 1; y = x1 − (z >> 1); | 2 adds + 3 shifts | 2 |
| I = 15/16 | J = 10/16 | x1 = x + (x >> 2); z = x1 >> 1; y = x1 − (z >> 1); | 2 adds + 3 shifts | 2 |
| K = 17/16 | L = 6/16 | x1 = x − (x >> 2); z = x1 >> 1; y = x + (x >> 4); | 2 adds + 3 shifts | 2 |
| M = 18/16 | N = 1/16 | y = x + (x >> 3); z = x >> 4; | 1 add + 2 shifts | 2 |
| Total: | | | 22 adds + 36 shifts | |

In this instance, the total complexity after replacing the 36 multiplications noted above with the 22 additions and 36 shifts results in an overall implementation complexity of 94 additions and 36 shifts.

Given the above complexity analysis, the first design provides adequate approximations of performing a DCT and requires fewer operations to perform than the other designs. The second design involves a relatively moderate increase in operations to perform the DCT approximation when compared to the first design but also improves on the accuracy of performing the DCT when compared to the first design. The third design is the most complex of the three designs but also provides the most accurate approximation of performing a DCT of the three designs. Depending on the context in which these are employed, one or more of these potential designs may be employed. For mobile applications that require efficient power consumption as one example, the first design may be employed considering that the low implementation complexity generally translates into improved power efficiency. For devices that are less concerned with power efficiency, the second design may provide an adequate balance of performance in terms of accuracy with respect to implementation complexity. For instances where higher levels of accuracy are required, the third design may be employed to provide the most accurate of the three designs in terms of approximating a DCT.

While described in the example of FIG. 4 with respect to a DCT-II unit, this DCT-II unit may also represent an IDCT constructed in accordance with the techniques of this disclosure. Forming an inverse DCT from the implementation shown in the example of FIG. 4 involves reversing the inputs and the outputs such that inputs are received by the implementation on the right of FIG. 4 and outputs are output at the left of the implementation. In other words, inverting the implementation about the vertical access such that the inputs then become the outputs and the outputs become the inputs would generally produce the IDCT implementation. For ease of illustration purposes and considering that forming an IDCT from a DCT is well known in the art, these additional IDCT implementations are not shown in separate FIGS.

Figure 5:
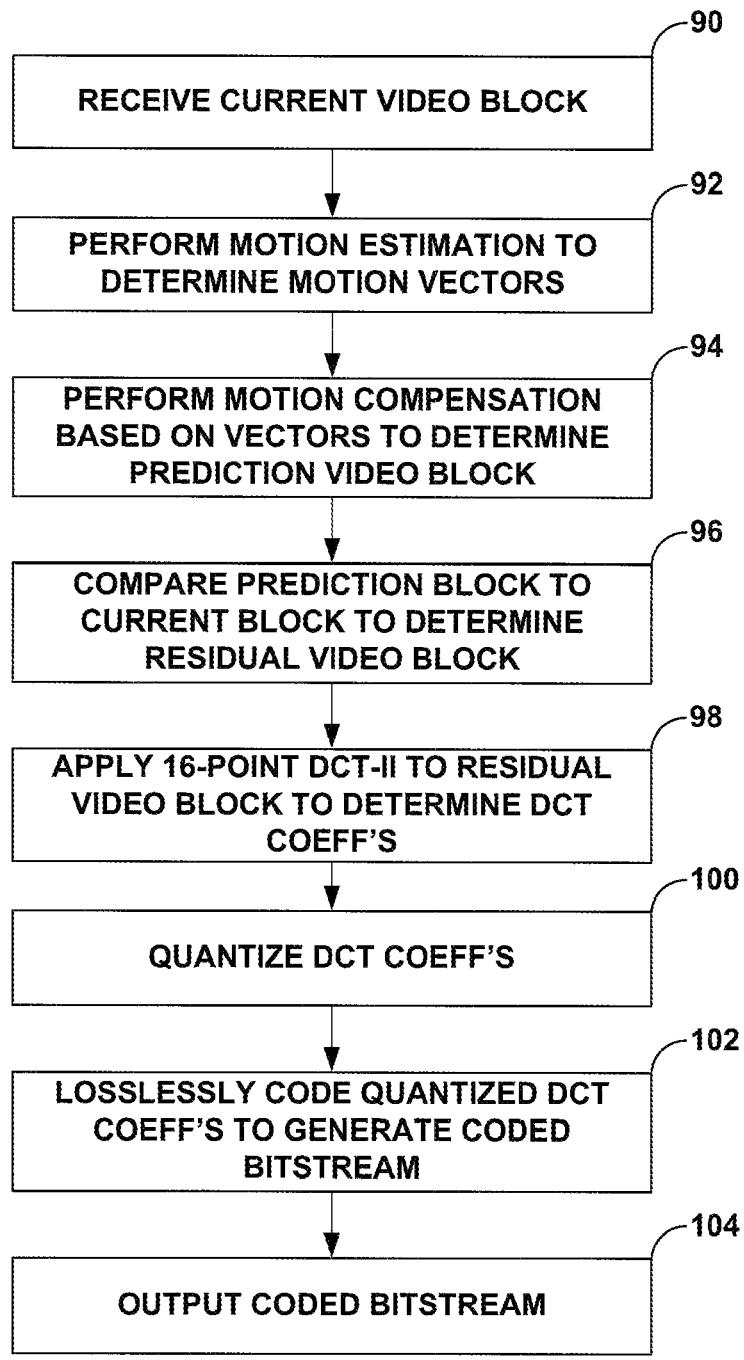
FIG. 5 is a flow chart illustrating exemplary operation of a coding device in applying a 16-point DCT implementation constructed in accordance with the techniques of this disclosure.

FIG. 5 is a flow chart illustrating exemplary operation of a coding device, such as video encoder 20 of FIG. 2, in applying a 16-point DCT implementation constructed in accordance with the techniques of this disclosure. Initially, video encoder 20 receives a current video block 30 within a video frame to be encoded (90). Motion estimation unit 32 performs motion estimation to compare video block 30 to blocks in one or more adjacent video frames to generate one or more motion vectors (92). The adjacent frame or frames may be retrieved from memory 34. Motion estimation may be performed for blocks of variable sizes, e.g., 16×16, 16×8, 8×16, 8×8, 4×4 or smaller block sizes. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bi-directional prediction. Using the resulting block partitions and motion vectors, motion compensation unit 36 forms a prediction video block (94).

Video encoder 20 forms a residual video block by subtracting the prediction video block produced by motion compensation unit 36 from the original, current video block 30 at summer 48 (96). Block transform unit 38 applies a transform producing residual transform block coefficients. Block transform unit 38 includes 16-point DCT-II unit 52 configured in accordance with the techniques described in this disclosure. Block transform unit 38 invokes scaled 16-point DCT-II unit 52 to apply one or more DCTs-II of a given size to the residual block to produce correspondingly sized blocks of residual transform coefficients in the manner described above. Referring to the example of FIGS. 4A-4D, 16-point DCT-II unit 52 may invoke one or more of 4-point DCT-II units 76 to concurrently apply a 4-point DCT-II to a different 4×4 residual block of data. Alternatively, 16-point DCT-II unit 52 may invoke 8-point DCT-II unit 72 to apply an 8-point DCT-II to an 8×8 residual block. As yet another alternative, 16-point DCT-II unit 52 may invoke all of sub or nested 4-point DCT-II units 72, 8-point DCT-II unit 72 and 8-point DCT-IV unit 74 to apply a 16-point DCT-II to process a 16×16 block of residual data. 16-point DCT-II unit 52 generally transforms the residual block from the spatial domain, which is represented as residual pixel data, to the frequency domain, which is represented as DCT coefficients. In this way, 16-point DCT-II unit 52 applies a one or more correspondingly sized DCTs-II to residual data to determine DCT coefficients (98). The transform coefficients may comprise DCT coefficients that include at least one DC coefficient and one or more AC coefficients.

Quantization unit 40 quantizes (e.g., rounds) the residual transform block coefficients to further reduce bit rate (100). As mentioned above, quantization unit 40 accounts for the scaled nature of scaled 16-point DCT-II unit 52 by incorporating factors removed during factorization, which are identified above by the diagonal scale factor matrix S. As quantization typically involves multiplication, incorporating these factors into quantization unit 40 may not increase the implementation complexity of quantization unit 40. In this respect, removing the factors from scaled 16-point DCT-II unit 52 may decrease the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 performs a statistical lossless coding, referred to in some instances, as entropy coding to generate a coded bitstream (102). Entropy coding unit 46 models a probability distribution of quantized DCT coefficients and selects a codebook based on the modeled probability distribution. Using this codebook, entropy coding unit 46 selects codes for each quantized DCT coefficient in a manner that compresses quantized DCT coefficients. Entropy coding unit 46 outputs the entropy coded coefficients as a coded bit-stream which is stored to a memory or storage device and/or sent to video decoder 26 (104).

Reconstruction unit 42 and inverse transform unit 44 reconstruct quantized coefficients and apply inverse transformation, respectively, to reconstruct the residual block. Again, inverse transform unit 44 may include an inverse DCT (IDCT), which is commonly referred to as a DCT of type III that performs the inverse operations of 16-point DCT-II unit 52, similar to 16-point DCT-III unit 68 described below with respect to FIG. 3. Summation unit 50 adds the reconstructed residual block to the motion compensated prediction block produced by motion compensation unit 36 to produce a reconstructed video block for storage in memory 34. The reconstructed video block is used by motion estimation unit 32 and motion compensation unit 36 to encode a block in a subsequent video frame.

Figure 6:
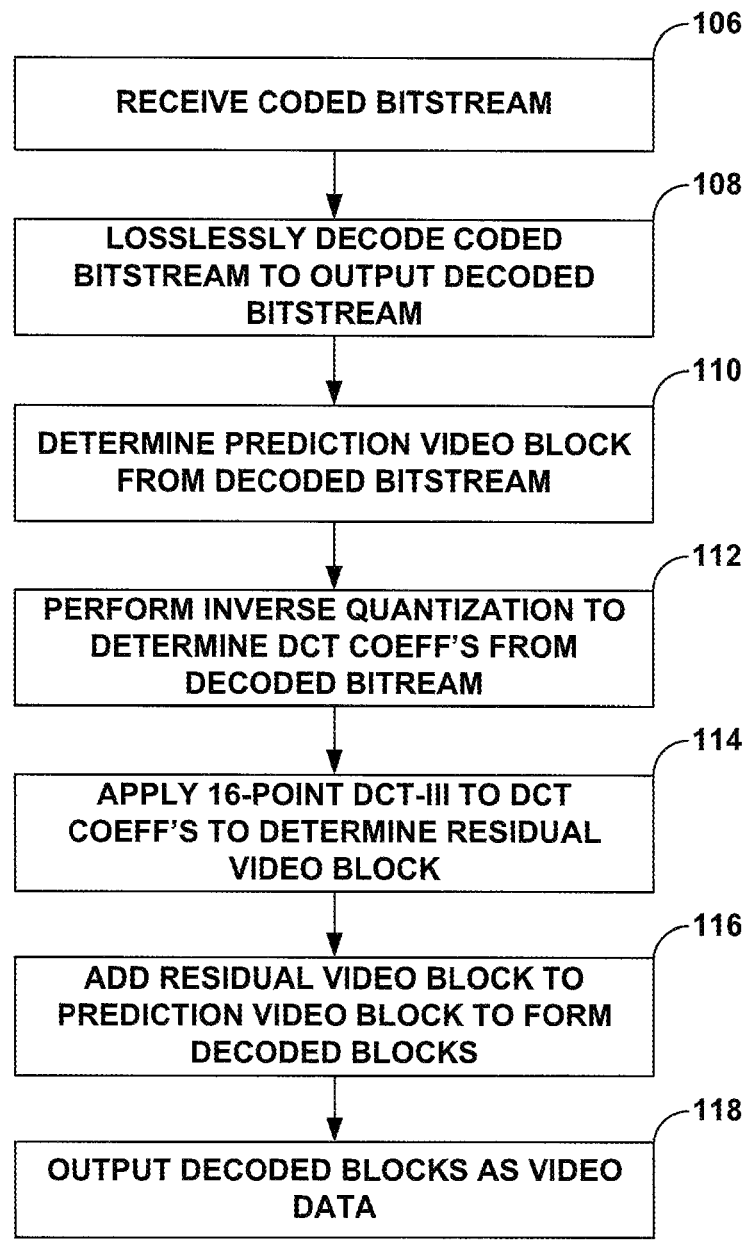
FIG. 6 is a flowchart illustrating example operation of a coding device in applying a 16-point DCT-III configured in accordance with the techniques of this disclosure.

FIG. 6 is a flowchart illustrating example operation of a coding device, such as video decoder 26 of FIG. 3, in applying a 16-point DCT-III configured in accordance with the techniques of this disclosure. Video decoder 26 receives an encoded video bitstream that has been encoded by video encoder 20. In particular, entropy decoding unit 54 receives the encoded video bitstream and decodes from the bitstream quantized residual coefficients and quantized parameters, as well as other information, such as macroblock coding mode and motion information, which may include motion vectors and block partitions (106, 108). Motion compensation unit 56 receives the motion vectors and block partitions and one or more reconstructed reference frames from memory 62 to produce a prediction video block (110).

Reconstruction unit 58 inverse quantizes, i.e., de-quantizes, the quantized block coefficients (112). Inverse transform unit 60 applies an inverse transform, e.g., an inverse DCT, to the coefficients to produce residual blocks. More specifically, inverse transform unit 60 includes a scaled 16-point DCT-III unit 68, which inverse transform unit 60 invokes to process the coefficients and thereby generate residual blocks (114). Scaled 16-point DCT-III unit 68, which is the inverse of scaled 16-point DCT-II unit 52 shown in FIG. 2, may transform the coefficients from the frequency domain to the spatial domain to produce the residual blocks in the manner described above. Similar to quantization unit 40 above, reconstruction unit 58 accounts for the scaled nature of 16-point DCT-III unit 68 by incorporating the external factors removed during factorization into the reconstruction process with little if any increase in implementation complexity. Removing factors from scaled 16-point DCT-III unit 68 may reduce implementation complexity, thereby resulting in a net decrease of complexity for video decoder 26.

The prediction video blocks are then summed by summer 66 with the residual blocks to form decoded blocks (116). A deblocking filter (not shown) may be applied to filter the decoded blocks to remove blocking artifacts. The filtered blocks are then placed in memory 62, which provides reference frame for decoding of subsequent video frames and also produces decoded video to drive a display device, such as display device 28 of FIG. 1 (118).

While described above with respect to DCT-II and DCT-III of size 16 that includes one or more nested 8-point DCT-II and DCT-III as well as one or more nested 4-point DCT-II and DCT-III, the techniques should not be limited to these particular sizes. Instead, the techniques may apply to any DCT-II or DCT-III of any size that includes smaller sized nested DCTs-II and -III. Consequently, the techniques should not be limited in this respect to the examples set forth in this disclosure.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware, software, firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium that is a physical non-transitory structure, and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the techniques have been described. These and other aspects are within the scope of the following claims.

The invention claimed is:

1. An apparatus comprising:
   a 16-point inverse discrete cosine transform (IDCT) unit that performs a plurality of IDCTs of different sizes that transform content data from a frequency domain to a spatial domain, wherein the content data comprises one or more of coded image data and coded video data, wherein the plurality of IDCTs of different sizes include internal factors selected such that the plurality of IDCTs of different sizes satisfies an orthogonality property, wherein the internal factors are selected from a predetermined data set according to one or more of an approximation error, power efficiency, implementation complexity and a level of accuracy,
   wherein the 16-point IDCT unit includes:
   an 8-point IDCT unit that performs one of the plurality of IDCTs of size 8;
   a first 4-point IDCT unit that performs one of the plurality of IDCTs of size 4, wherein the 8-point IDCT unit includes the first 4-point IDCT unit; and
   an inverse 8-point DCT-IV unit that comprises a second 4-point IDCT unit and a third 4-point IDCT unit, each of which performs one of the plurality of IDCTs of size 4,
   wherein each of 4-point DCT-II units includes two of the internal factors with either preset integer values or preset dyadic rational values of a first same power of two,
   wherein the 8-point DCT-II includes four of the internal factors with either preset integer values or preset dyadic rational values of a second same power of two, and
   wherein the 8-point DCT-IV unit includes eight of the internal factors with either preset integer values or preset dyadic rational values of a third same power of two.

2. The apparatus of claim 1, wherein the first, second and third 4-point IDCT units each concurrently performs the one of the plurality of IDCTs of size 4 to transform different portions of the content data from the frequency domain to the spatial domain.

3. The apparatus of claim 1,
   wherein the at least one 8-point IDCT unit performs the one of the plurality of IDCTs of size 8 to transform a first portion of the content data from the frequency domain to the spatial domain, and
   wherein, concurrent to the 8-point IDCT unit performing the one of the plurality of IDCTs of size 8, the second and third 4-point IDCT units each performs the one of the plurality of IDCTs of size 4 to transform respective second and third portions of the content data from the frequency domain to the spatial domain.

4. The apparatus of claim 1,
   wherein the at least one 8-point IDCT unit performs the one of the plurality of IDCTs of size 8 to transform a first portion of the content data from the frequency domain to the spatial domain, and
   wherein, concurrent to the 8-point IDCT unit performing the one of the plurality of IDCTs of size 8, either the second or third 4-point IDCT units performs the one of the plurality of IDCTs of size 4 to transform a second portion of the content data from the frequency domain to the spatial domain.

5. The apparatus of claim 1,
   wherein each of the first, second and third 4-point IDCT units include the internal factors A and B,
   wherein the 8-point IDCT unit includes the internal factors C, D, E and F, wherein the inverse 8-point DCT-IV unit includes internal factors G, H, I, J, K, L, M and N, and wherein internal factors A, B, C, D, E, F, G, H, I, J, K, L, M and N are set to respective values 1, 2, 11, 3, 9, 7, 15, 10, 15, 10, 17, 6, 18 and 1.

6. The apparatus of claim 1, wherein each of the first, second and third 4-point IDCT units include the internal factors A and B, wherein the 8-point IDCT unit includes the internal factors C, D, E and F, wherein the inverse 8-point DCT-IV unit includes the internal factors G, H, I, J, K, L, M and N, and wherein the internal factors A, B, C, D, E, F, G, H, I, J, K, L, M and N are normalized such that these internal factors become dyadic rational values, wherein a first denominator used to normalize the internal factors A and B is a first power of two, wherein a second denominator used to normalize the internal factors C, D, E, and F is a second power of two, and wherein a third denominator used to normalize the internal factors G, H, I, J, K, L, M and N is a third power of two.

7. The apparatus of claim 6, wherein the internal factors A, B, C, D, E, F, G, H, I, J, K, L, M and N are normalized such that these internal factors are set to respective values 1/2, 1, 11/16, 3/16, 9/16, 7/16, 15/16, 10/16, 15/16, 10/16, 17/16, 6/16, 18/16 and 1/16.

8. The apparatus of claim 6, wherein the internal factors A, B, C, D, E, F, G, H, I, J, K, L, M and N are normalized such that these internal factors are set to respective values 1/2, 1, 11/16, 3/16, 9/16, 7/16, 34/64, 27/64, 38/64, 21/64, 42/64, 11/64, 43/64 and 6/64.

9. The apparatus of claim 6, wherein the internal factors A, B, C, D, E, F, G, H, I, J, K, L, M and N are normalized such that these internal factors are set to respective values 2/4, 5/4, 19/32, 4/32, 16/32, 11/32, 34/64, 27/64, 38/64, 21/64, 42/64, 11/64, 43/64 and 6/64.

10. The apparatus of claim 1, wherein each of the first, second and third 4-point IDCT units include the internal factors A and B, wherein the 8-point IDCT unit includes the internal factors C, D, E and F, wherein the inverse 8-point DCT-IV unit includes the internal factors G, H, I, J, K, L, M and N, and wherein the internal factors A, B, C, D, E, F, G, H, I, J, K, L, M and N are set to respective values 1, 2, 11, 3, 9, 7, 34, 27, 38, 21, 42, 11, 43 and 6.

11. The apparatus of claim 1, wherein each of the first, second and third 4-point IDCT units include the internal factors A and B, wherein the 8-point IDCT unit includes the internal factors C, D, E and F, wherein the inverse 8-point DCT-IV unit includes the internal factors G, H, I, J, K, L, M and N, and wherein the internal factors A, B, C, D, E, F, G, H, I, J, K, L, M and N are set to respective values 2, 5, 19, 4, 16, 11, 34, 27, 38, 21, 42, 11, 43 and 6.

12. The apparatus of claim 1, wherein the 16-point IDCT unit performs one of the plurality of IDCTs of size 16 to transform the content data from the frequency domain to the spatial domain.

13. The apparatus of claim 1, wherein the 16-point IDCT unit comprises a scaled 16-point IDCT unit that performs a plurality of scaled IDCTs of different sizes that transform the content data from the frequency domain to the spatial domain and output scaled IDCT coefficients, wherein the apparatus further comprises a quantization unit that applies scale factors to the scaled IDCT coefficients so as to generate quantized full IDCT coefficients.

14. The apparatus of claim 1, wherein the apparatus comprises a multimedia coding device, and wherein the content data includes one or more of video data, image data and audio data.

15. The apparatus of claim 1, wherein the apparatus comprises a handset.

16. The apparatus of claim 1, wherein the 16-point IDCT-II unit performs two or more of the plurality of IDCTs-II of different sizes so as to implement two-dimensional IDCTs-II of different sizes, wherein the different sizes include 16×16, 16×8, 8×16, 8×8, 8×4, 4×8 and 4×4.

17. A method comprising:

receiving content data with a coding device, wherein the content data comprises one or more of coded image data and coded video data; and performing one or more of a plurality of inverse discrete cosine transforms (IDCTs) that transform the received content data from a frequency domain to a spatial domain with a 16-point IDCT unit included within the coding device, wherein the plurality of IDCTs of different sizes include internal factors selected such that each of the plurality of IDCTs of different sizes satisfies an orthogonality property, wherein the internal factors are selected from a predetermined data set according to one or more of an approximation error, power efficiency, implementation complexity and a level of accuracy, wherein the 16-point IDCT unit includes:

at least one 8-point IDCT unit to perform one of the plurality of IDCTs of size 8;

a first 4-point IDCT unit to perform one of the plurality of IDCTs of size 4, wherein the at least one 8-point IDCT unit includes the first 4-point IDCT unit; and an inverse 8-point DCT-IV unit comprising a second 4-point IDCT unit and a third 4-point IDCT unit, each of which performs one of the plurality of IDCTs of size 4, wherein each of 4-point DCT-II units includes two of the internal factors with either preset integer values or preset dyadic rational values of a first same power of two, wherein the 8-point DCT-II includes four of the internal factors with either preset integer values or preset dyadic rational values of a second same power of two, and wherein the 8-point DCT-IV unit includes eight of the internal factors with either preset integer values or preset dyadic rational values of a third same power of two.

18. The method of claim 17, further comprising concurrently performing, with the first, second and third 4-point IDCT units, the one of the plurality of IDCTs of size 4 to transform different portions of the content data from the frequency domain to the spatial domain.

19. The method of claim 17, further comprising:

performing, with the at least one 8-point IDCT unit, the one of the plurality of IDCTs of size 8 to transform a first portion of the content data from the frequency domain to the spatial domain, and concurrent to the 8-point IDCT unit performing the one of the plurality of IDCTs of size 8, performing the one of the plurality of IDCTs of size 4 with each of the second and third 4-point IDCT units to transform respective second and third portions of the content data from the frequency domain to the spatial domain.

20. The method of claim 17, further comprising:
performing the one of the plurality of IDCTs of size 8 with the at least one 8-point IDCT unit to transform a first portion of the content data from the frequency domain to the spatial domain, and
concurrent to the 8-point IDCT unit performing the one of the plurality of IDCTs of size 8, performing the one of the plurality of IDCTs of size 4 with either the second or third 4-point IDCT units to transform a second portion of the content data from the frequency domain to the spatial domain.

21. The method of claim 17,
wherein each of the first, second and third 4-point IDCT units include the internal factors A and B,
wherein the 8-point IDCT unit includes the internal factors C, D, E and F,
wherein the inverse 8-point DCT-IV unit includes the internal factors G, H, I, J, K, L, M and N, and
wherein the internal factors A, B, C, D, E, F, G, H, I, J, K, L, M and N are set to respective values 1, 2, 11, 3, 9, 7, 15, 10, 15, 10, 17, 6, 18 and 1.

22. The method of claim 17,
wherein each of the first, second and third 4-point IDCT units include the internal factors A and B,
wherein the 8-point IDCT unit includes the internal factors C, D, E and F,
wherein the inverse 8-point DCT-IV unit includes the internal factors G, H, I, J, K, L, M and N, and
wherein the internal factors A, B, C, D, E, F, G, H, I, J, K, L, M and N are normalized such that these internal factors become dyadic rational values,
wherein a first denominator used to normalize the internal factors A and B is a first power of two,
wherein a second denominator used to normalize the internal factors C, D, E, and F is a second power of two, and
wherein a third denominator used to normalize the internal factors G, H, I, J, K, L, M and N is a third power of two.

23. The method of claim 22, wherein the internal factors A, B, C, D, E, F, G, H, I, J, K, L, M and N are normalized such that these internal factors are set to respective values 1/2, 1, 11/16, 3/16, 9/16, 7/16, 15/16, 10/16, 15/16, 10/16, 17/16, 6/16, 18/16 and 1/16.

24. The method of claim 22, wherein the internal factors A, B, C, D, E, F, G, H, I, J, K, L, M and N are normalized such that these internal factors are set to respective values 1/2, 1, 11/16, 3/16, 9/16, 7/16, 34/64, 27/64, 38/64, 21/64, 42/64, 11/64, 43/64 and 6/64.

25. The method of claim 22, wherein the internal factors A, B, C, D, E, F, G, H, I, J, K, L, M and N are normalized such that these internal factors are set to respective values 2/4, 5/4, 19/32, 4/32, 16/32, 11/32, 34/64, 27/64, 38/64, 21/64, 42/64, 11/64, 43/64 and 6/64.

26. The method of claim 17,
wherein each of the first, second and third 4-point IDCT units include the internal factors A and B,
wherein the 8-point IDCT unit includes the internal factors C, D, E and F,
wherein the inverse 8-point DCT-IV unit includes the internal factors G, H, I, J, K, L, M and N, and
wherein the internal factors A, B, C, D, E, F, G, H, I, J, K, L, M and N are set to respective values 1, 2, 11, 3, 9, 7, 34, 27, 38, 21, 42, 11, 43 and 6.

27. The method of claim 17,
wherein each of the first, second and third 4-point IDCT units include the internal factors A and B,
wherein the 8-point IDCT unit includes the internal factors C, D, E and F,
wherein the inverse 8-point DCT-IV unit includes the internal factors G, H, I, J, K, L, M and N, and
wherein the internal factors A, B, C, D, E, F, G, H, I, J, K, L, M and N are set to respective values 2, 5, 19, 4, 16, 11, 34, 27, 38, 21, 42, 11, 43 and 6.

28. The method of claim 17, wherein the 16-point IDCT unit performs one of the plurality of IDCTs of size 16 to transform the content data from the frequency domain to the spatial domain.

29. The method of claim 17,
wherein the 16-point IDCT unit comprises a scaled 16-point IDCT unit that performs a plurality of scaled IDCTs of different sizes that transform the content data from the frequency domain to the spatial domain and output scaled IDCT coefficients,
wherein the method further comprises applying scale factors with a quantization unit to the scaled IDCT coefficients so as to generate quantized full IDCT coefficients.

30. The method of claim 17,
wherein the method is performed within a multimedia coding device, and
wherein the content data includes one or more of video data, image data and audio data.

31. The method of claim 17, wherein the method is performed within a handset.

32. The method of claim 17, further comprising performing two or more of the plurality of IDCTs-II of different sizes so as to implement two-dimensional IDCTs-II of different sizes, wherein the different sizes include 16×16, 16×8, 8×16, 8×8, 8×4, 4×8 and 4×4.

33. A non-transitory computer-readable storage medium comprising instructions that when executed cause a processor to:
receive content data with a coding device, wherein the content data comprises one or more of coded image data and coded video data; and
perform one or more of a plurality of inverse discrete cosine transforms (IDCTs) that transform the received content data from a frequency domain to a spatial domain with a 16-point IDCT unit included within the coding device, wherein the plurality of IDCTs of different sizes include internal factors selected such that each of the plurality of IDCTs of different sizes satisfies an orthogonality property, wherein the internal factors are selected from a predetermined data set according to one or more of an approximation error, power efficiency, implementation complexity and a level of accuracy,
wherein the 16-point IDCT unit includes:
at least one 8-point IDCT unit to perform one of the plurality of IDCTs of size 8;
a first 4-point IDCT unit to perform one of the plurality of scaled IDCTs of size 4, wherein the at least one 8-point IDCT unit includes the first 4-point IDCT unit; and
an inverse 8-point DCT-IV unit comprising a second 4-point IDCT unit and a third 4-point IDCT unit, each of which performs one of the plurality of IDCTs of size 4,
wherein each of 4-point DCT-II units includes two of the internal factors with either preset integer values or preset dyadic rational values of a first same power of two,
wherein the 8-point DCT-II includes four of the internal factors with either preset integer values or preset dyadic rational values of a second same power of two, and
wherein the 8-point DCT-IV unit includes eight of the internal factors with either preset integer values or preset dyadic rational values of a third same power of two.

34. The non-transitory computer-readable storage medium of claim 33, wherein the instructions cause the processor to concurrently perform, with the first, second and third 4-point IDCT units, the one of the plurality of IDCTs of size 4 to transform different portions of the content data from the frequency domain to the spatial domain.

35. The non-transitory computer-readable storage medium of claim 33, wherein the instructions further cause the processor to:
perform, with the at least one 8-point IDCT unit, the one of the plurality of IDCTs of size 8 to transform a first portion of the content data from the frequency domain to the spatial domain; and
concurrent to the 8-point IDCT unit performing the one of the plurality of IDCTs of size 8, perform the one of the plurality of IDCTs of size 4 with each of the second and third 4-point IDCT units to transform respective second and third portions of the content data from the frequency domain to the spatial domain.

36. The non-transitory computer-readable storage medium of claim 33, wherein the instructions further cause the processor to:
perform the one of the plurality of IDCTs of size 8 with the at least one 8-point IDCT unit to transform a first portion of the content data from the frequency domain to the spatial domain; and
concurrent to the 8-point IDCT unit performing the one of the plurality of IDCTs of size 8, perform the one of the plurality of IDCTs of size 4 with either the second or third 4-point IDCT units to transform a second portion of the content data from the frequency domain to the spatial domain.

37. The non-transitory computer-readable storage medium of claim 33, wherein the instructions further cause the processor to perform two or more of the plurality of IDCTs-II of different sizes so as to implement two-dimensional IDCTs-II of different sizes, wherein the different sizes include 16×16, 16×8, 8×16, 8×8, 8×4, 4×8 and 4×4.

38. A device comprising:
means for receiving content data, wherein the content data comprises one or more of coded image data and coded video data; and
means for performing one or more of a plurality of inverse discrete cosine transforms that transform the received content data from a frequency domain to a spatial domain, wherein the means for performing the plurality of IDCTs of different sizes include means for applying, to the content data, internal factors selected such that each of the plurality of IDCTs of different sizes satisfies an orthogonality property, wherein the internal factors are selected from a predetermined data set according to one or more of an approximation error, power efficiency, implementation complexity and a level of accuracy,
wherein the means for performing the one or more of a plurality of IDCTs includes:
means for performing one of the plurality of IDCTs-II of size 8;
first means for performing a first one of the plurality of scaled IDCTs-II of size 4, wherein the means for performing one of the plurality of IDCTs-II of size 8 comprises the first means for performing one of the plurality of scaled IDCTs-II of size 4;
second means for performing a second one of the plurality of IDCTs-II of size 4; and
third means for performing a third one of the plurality of scaled IDCTs-II of size 4,
wherein each of 4-point DCT-II units includes two of the internal factors with either preset integer values or preset dyadic rational values of a first same power of two,
wherein the 8-point DCT-II includes four of the internal factors with either preset integer values or preset dyadic rational values of a second same power of two, and
wherein the 8-point DCT-IV unit includes eight of the internal factors with either preset integer values or preset dyadic rational values of a third same power of two.

39. The device of claim 38,
wherein the first means for performing a first one of the plurality of scaled IDCTs-II of size 4 comprises a first 4-point IDCT-II unit,
wherein means for performing one or more of the plurality of IDCTs-II comprises a 16-point IDCT-II unit,
wherein the second means for performing the second one of the plurality of IDCTs-II of size 4 includes a second 4-point IDCT-II unit,
wherein the third means for performing the third one of the plurality of IDCTs-II of size 4 includes a third 4-point IDCT-II unit,
wherein the means for performing the one of the plurality of IDCTs-II of size 8 includes an 8-point IDCT-II unit comprising the first 4-point IDCT-II unit,
wherein the 16-point IDCT unit includes an inverse 8-point DCT-IV unit, and
wherein the inverse 8-point DCT-IV unit includes the second 4-point IDCT-II unit and the third 4-point DCT-II unit.

40. The device of claim 39, wherein the first, second and third 4-point IDCT units each concurrently performs the one of the plurality of IDCTs of size 4 to transform different portions of the content data from the frequency domain to the spatial domain.

41. The device of claim 39,
wherein the at least one 8-point IDCT unit performs the one of the plurality of IDCTs of size 8 to transform a first portion of the content data from the frequency domain to the spatial domain, and
wherein, concurrent to the 8-point IDCT unit performing the one of the plurality of IDCTs of size 8, the second and third 4-point IDCT units each performs the one of the plurality of IDCTs of size 4 to transform respective second and third portions of the content data from the frequency domain to the spatial domain.

42. The device of claim 39,
wherein the at least one 8-point IDCT unit performs the one of the plurality of IDCTs of size 8 to transform a first portion of the content data from the frequency domain to the spatial domain, and
wherein, concurrent to the 8-point IDCT unit performing the one of the plurality of IDCTs of size 8, either the second or third 4-point IDCT units performs the one of the plurality of IDCTs of size 4 to transform a second portion of the content data from the frequency domain to the spatial domain.

43. The device of claim 39,
wherein each of the first, second and third 4-point IDCT units include the internal factors A and B,
wherein the 8-point IDCT unit includes the internal factors C, D, E and F,
wherein the inverse 8-point DCT-IV unit includes the internal factors G, H, I, J, K, L, M and N, and
wherein the internal factors A, B, C, D, E, F, G, H, I, J, K, L, M and N are set to respective values 1, 2, 11, 3, 9, 7, 15, 10, 15, 10, 17, 6, 18 and 1.

44. The device of claim 39,
wherein each of the first, second and third 4-point IDCT units include the internal factors A and B, wherein the 8-point IDCT unit includes the internal factors C, D, E and F, wherein the inverse 8-point DCT-IV unit includes the internal factors G, H, I, J, K, L, M and N, and wherein the internal factors A, B, C, D, E, F, G, H, I, J, K, L, M and N are normalized such that these internal factors become dyadic rational values, wherein a first denominator used to normalize the internal factors A and B is a first power of two, wherein a second denominator used to normalize the internal factors C, D, E, and F is a second power of two, and wherein a third denominator used to normalize the internal factors G, H, I, J, K, L, M and N is a third power of two.

45. The device of claim 44, wherein the internal factors A, B, C, D, E, F, G, H, I, J, K, L, M and N are normalized such that these internal factors are set to respective values 1/2, 1, 11/16, 3/16, 9/16, 7/16, 15/16, 10/16, 15/16, 10/16, 17/16, 6/16, 18/16 and 1/16.

46. The device of claim 44, wherein the internal factors A, B, C, D, E, F, G, H, I, J, K, L, M and N are normalized such that these internal factors are set to respective values 1/2, 1, 11/16, 3/16, 9/16, 7/16, 34/64, 27/64, 38/64, 21/64, 42/64, 11/64, 43/64 and 6/64.

47. The device of claim 44, wherein the internal factors A, B, C, D, E, F, G, H, I, J, K, L, M and N are normalized such that these internal factors are set to respective values 2/4, 5/4, 19/32, 4/32, 16/32, 11/32, 34/64, 27/64, 38/64, 21/64, 42/64, 11/64, 43/64 and 6/64.

48. The device of claim 39, wherein each of the first, second and third 4-point IDCT units include the internal factors A and B, wherein the 8-point IDCT unit includes the internal factors C, D, E and F, wherein the inverse 8-point DCT-IV unit includes the internal factors G, H, I, J, K, L, M and N, and wherein the internal factors A, B, C, D, E, F, G, H, I, J, K, L, M and N are set to respective values 1, 2, 11, 3, 9, 7, 34, 27, 38, 21, 42, 11, 43 and 6.

49. The device of claim 39, wherein each of the first, second and third 4-point IDCT units the include internal factors A and B, wherein the 8-point IDCT unit includes the internal factors C, D, E and F, wherein the inverse 8-point DCT-IV unit includes the internal factors G, H, I, J, K, L, M and N, and wherein the internal factors A, B, C, D, E, F, G, H, I, J, K, L, M and N are set to respective values 2, 5, 19, 4, 16, 11, 34, 27, 38, 21, 42, 11, 43 and 6.

50. The device of claim 38, wherein means for performing one or more of a plurality of IDCTs performs one of the plurality of IDCTs of size 16 to transform the content data from the frequency domain to the spatial domain.

51. The device of claim 38, wherein means for performing one or more of a plurality of IDCTs includes means for performing a plurality of scaled IDCTs of different sizes that transform the content data from the frequency domain to the spatial domain and output scaled IDCT coefficients, wherein the device further comprises a means for applying scale factors to the scaled IDCT coefficients so as to generate quantized full IDCT coefficients.

52. The device of claim 38, wherein the device comprises a multimedia coding device, and wherein the content data includes one or more of video data, image data and audio data.

53. The device of claim 38, wherein the device comprises a handset.

\* \* \* \* \*